US011308764B1

(12) United States Patent
Seidel et al.

(10) Patent No.: US 11,308,764 B1
(45) Date of Patent: Apr. 19, 2022

(54) SOCIAL CROWDSOURCED PARLAY GAMING SYSTEM AND METHOD

(71) Applicants: Tanya E. Seidel, Incline Village, NV (US); Thomas J. Leone, Incline Village, NV (US)

(72) Inventors: Tanya E. Seidel, Incline Village, NV (US); Thomas J. Leone, Incline Village, NV (US)

( * ) Notice: Subject to any disclaimer, the term of this patent is extended or adjusted under 35 U.S.C. 154(b) by 0 days.

(21) Appl. No.: 17/483,303

(22) Filed: Sep. 23, 2021

Related U.S. Application Data

(60) Provisional application No. 63/139,931, filed on Jan. 21, 2021.

(51) Int. Cl.
*G07F 17/32* (2006.01)
*H04W 4/021* (2018.01)
*G06Q 50/34* (2012.01)

(52) U.S. Cl.
CPC ......... *G07F 17/3274* (2013.01); *G06Q 50/34* (2013.01); *G07F 17/3209* (2013.01); *G07F 17/3239* (2013.01); *G07F 17/3288* (2013.01); *H04W 4/021* (2013.01)

(58) Field of Classification Search
CPC ............. G07F 17/3274; G07F 17/3209; G07F 17/3239; G07F 17/3288; G96Q 50/34; H04W 4/021
See application file for complete search history.

(56) References Cited

U.S. PATENT DOCUMENTS

| | | |
|---|---|---|
| 8,651,957 B2 | 2/2014 | Goldman et al. |
| 9,408,034 B2 * | 8/2016 | Zhu ................... H04W 4/70 |
| 9,569,922 B1 | 2/2017 | Johnson et al. |
| 2001/0037211 A1* | 11/2001 | McNutt ............... G07F 17/3288 463/29 |
| 2008/0132331 A1* | 6/2008 | Gatto .................. G07F 17/32 463/31 |
| 2010/0144426 A1 | 6/2010 | Winner et al. |
| 2010/0160035 A1 | 6/2010 | Herrmann |
| 2011/0053681 A1 | 3/2011 | Goldman et al. |
| 2013/0303273 A1* | 11/2013 | Lipka .................. G07F 17/3258 463/26 |
| 2015/0228151 A1* | 8/2015 | Damodaran ........ G07F 17/3244 463/25 |
| 2018/0365788 A1* | 12/2018 | Said ....................... G06Q 40/06 |
| 2019/0333339 A1 | 10/2019 | Amaitis et al. |
| 2020/0027315 A1* | 1/2020 | Cotton ................. G06Q 20/08 |
| 2021/0110666 A1* | 4/2021 | Thomas .............. G07F 17/3211 |

FOREIGN PATENT DOCUMENTS

WO 2018142215 A1 8/2018

* cited by examiner

*Primary Examiner* — Corbett B Coburn
(74) *Attorney, Agent, or Firm* — Fresh IP PLC; John R. Bednarz

(57) ABSTRACT

A unique online and mobile, social sports betting system where players submit single bets on future sporting events, to form multiplayer parlay tickets. A parlay, in this case, is a single wager that links together multiple unique bets whose outcome is dependent on all of those bets winning. Registered users in the system can only submit one bet to any given parlay ticket, but can participate in multiple parlay tickets. If all the bets in the parlay win, each player equally shares in the parlay payout. If one or more bets do not win, players that win or push their individual parlay bets get the cost of the ticket refunded, while losing players cover the cost of the entire parlay ticket.

19 Claims, 28 Drawing Sheets

ABOUT PARLAYMINT ▽    LOCATIONS ▽    SUPPORT ▽      Email Address    Password    SIGN IN

— 401   402   403      404    405    406

Parlaymint
Team up, Share the wealth

Squad Goals:
Top 10 Teams

1. SargeScidel    $7,432.44
2. VikesFanTom    $6435.22
3. BroC    $5,367.37
4. OcweyBillsFan    $5,005.33
5. OcraidoRoch    $3,502.22
6. OcMomGo    $2,876.33
7. OcDuse    $2,043.97
8. Oranson3234    $1,984.43
9. NevadaoBlue    $855.32
10. Labauda_420    $530.23

Last Week's Biggest Payout

1. OVER 54.5 NEV/UNLV
2. TAMPA BAY BUCS -4
3. SEATTLE SEAHAWKS -5.5
4. MINNESOTA VIKINGS +5
5. UNDER 44 PITTS/BALT
6. MIAMI DOLPHINS +5
7. SF 49ERS -4
8. UFLORIDA GATORS -4

$6,456 from a $24 ticket!

PLAY NOW! ← 407

Last Week's Top 10 Players

1. SargeScidel    $7,432.44
2. VikesFanTom    $6435.22
3. BroC    $5,367.37
4. OcweyBillsFan    $5,005.33
5. OcraidoRoch    $3,502.22
6. OcMomGo    $2,876.33
7. OcDuse    $2,043.97
8. Oranson3234    $1,984.43
9. NevadaoBlue    $855.32
10. Labauda_420    $530.23

Black bar is a sticker-style item that shows stats and is scrolling horizontally and is updated real-time Members: 1,563,643    Open Parlays: 5,413    Winning Parlays: 6,335    Total Winnings: $5,413

Join the Parlaymint!

JOIN A PARLAY ← 408      START A NEW PARLAY ← 409      FORM A GROUP ← 410

JOIN A PARLAY
Add your best bet to an existing parlay with other winning teams.

START A NEW PARLAY
Start a new winning parlay with your preferred price point and number of teams.

FORM A GROUP
Gather friends to pool your collective sports knowledge and form parlay bets together.

What is Parlay Bet?

A parlay is a single bet that combines two or more individual sports bets. You win your parlay when all of the individual bets win.

Why do we like them?

Parlays require low risk for a high reward, and the more bets you add to the parlay, the greater your return! For example, a 7-team parlay bet for $1 pays $90! Not a bad ROI on $1.

What are the rules?

The rules are simple. You win your parlay when all of the individual bets win, or in other words, all of the teams in your bets cover their spreads. Within your group, if your bet wins but other participants in the parlay did not win, they pay for your price of entry. When you win your bet, you pay for free, even if the parlay did not win.

Pool your collective sports knowledge to create winning parlays. Each VIP status and create exclusive parlays with only your fellow successful parlaymint players.

Join the PARLAYMINT

Members: 1,563,643      Open PARLAYS: 5,413

Join the PARLAYMINT

CONGRATULATIONS! You are in a location where it is legal to participate in PARLAYMINT.

FIRST NAME

LAST NAME

EMAIL ← 500

USER NAME

PASSWORD

JOIN NOW ← 501

JOIN A PARLAY     TIME REMAINING: 4m 20s

3 Bets
$2 per bet
NFL 🏈 NCAA 🏈
All bet types allowed
◈ LET IT ROLL
↑ Quickly join a parlay
701

My Bet:
Select your bet below

| The Citidel (+45) |

○ NCAAF Most Popular Pack
○ NFL Most Popular Pack    ○ NCAAF Most Popular Pack
○ NFL Most Popular Pack    ● NCAAF Most Popular Pack    ○ Break open the pinata!
○ NFL Most Popular Pack    ○ NCAAF Most Popular Pack    ○ Show me a random pick
○ NFL Most Popular Pack

↗ 702

Parlay Price: $6.00

Max Payout:    $39.00
Your Max Payout:    $13.00

Select Your Bet:
NFL Games
CONFERENCES: <All Conferences>

| THURS, 9:30AM | Money Line | Point Spread | Over, Under |
|---|---|---|---|
| TEXANS | ○ -160 | ○ -3 | ○ OVER 51.5 |
| LIONS | ○ +140 | ○ +3 | ○ UNDER 51.5 |

| THURS, 1:30AM | Money Line | Point Spread | Over, Under |
|---|---|---|---|
| WASHINGTON FB TEAM | ○ +135 | ○ +3 | ○ OVER 46 |
| COWBOYS | ○ -155 | ○ -3 | ○ UNDER 46 |

| THURS, 9:30AM | Money Line | Point Spread | Over, Under |
|---|---|---|---|
| RAVENS | O +200 | O +5.5 | O OVER 44.5 |
| STEELERS | O -240 | O -5.5 | O UNDER 44.5 |

Notify me when:
- ☑ New bets are placed into this parlay.
- ☐ An individual bet is locked.
- ☑ All bets are locked.

- ☐ The result of each bet is final.
- ☑ The parlay results is final.
- ☐ Votes for or against Hedging this ✓ You have funds available for this parlay!

[ ⊘ PLACE MY BET ]

NFL Games
CONFERENCES: <All Conferences

| THURS, 9:30AM | Money Line | Point Spread | Over, Under |
|---|---|---|---|
| TEXANS | O -160 | O -3 | O OVER 51.5 |
| LIONS | O +140 | O +3 | O UNDER 51.5 |

| THURS, 1:30AM | Money Line | Point Spread | Over, Under |
|---|---|---|---|
| WASHINGTON FB TEAM | O +135 | O +3 | O OVER 46 |
| COWBOYS | O -155 | O -3 | O UNDER 46 |

| THURS, 9:30AM | Money Line | Point Spread | Over, Under |
|---|---|---|---|
| RAVENS | O +200 | O +5.5 | O OVER 44.5 |
| STEELERS | O -240 | O -5.5 | O UNDER 44.5 |

☑ Hedge Select this to visit this you are willing to opt for guaranteed winnings if the last lag has yet to start. Each player must vote in favor of hedging this parlay.

⊘ CONFIRM PARLAY

FORM A NEW GROUP

Follow these steps to create your new parlay group:

① Select the number of people in your group. The number of your people in the group equates to the number of bets in your parlays. ◄── 1201

○3  ○4  ○5  ○6  ○7  ○8  ○9  ○10  ○11  ○12

② What's your group name ? ☐

③ What are the email addresses of your team members? If they already have a PARLAYMINT account, specify the email address they use for their account.

④ Would you like to include a message with your group invitation? Provide the text of your message below.

1202 ──►  Send group invitation

FIG. 12

Player Profile                              Player Since: 2020

Awards                    Last 10 Bets                         Parlay History

🏆 June VIP Tourney       10/09 - Steelers -12.5 WINNER!        3 Teams:  6 Wins / 4 Losses
$5.26  Average Bet        10/09 - Vikes -3 WINNER!              4 Teams:  4 Wins / 14 Losses
$500   Largest Payout     10/03 - Bucs +4.5 WINNER!             5 Teams:  5 Wins / 6 Losses
4.3    Average Parlay Size 10/02 - Ohio State - 14 LOSER!       6 Teams:  12 Wins / 4 Losses
                          10/01 - OVER Bucs 54.5 WINNER!        7 Teams:  0 Wins / 4 Losses
                          09/29 - Michigan - 4 LOSER            8 Teams:  1 Wins / 4 Losses
         EDIT             09/28 - Titans 4 WINNER               9 Teams:  6 Wins / 2 Losses
                          09/22 - Titans -3 WINNER              10 Teams: 0 Wins / 0 Losses
         1601             09/02 - Vikings -3.5 LOSER            11 Teams: 0 Wins / 0 Losses
Go_Vikes                  08/26 - Seahawks -4 LOSER             12 Teams: 0 Wins / 0 Losses ○ VIP
🔥 Streaking Hot
$$ $395.50 Total Bets
☑ Available for Groups 💬 Currently Online

FIG. 16

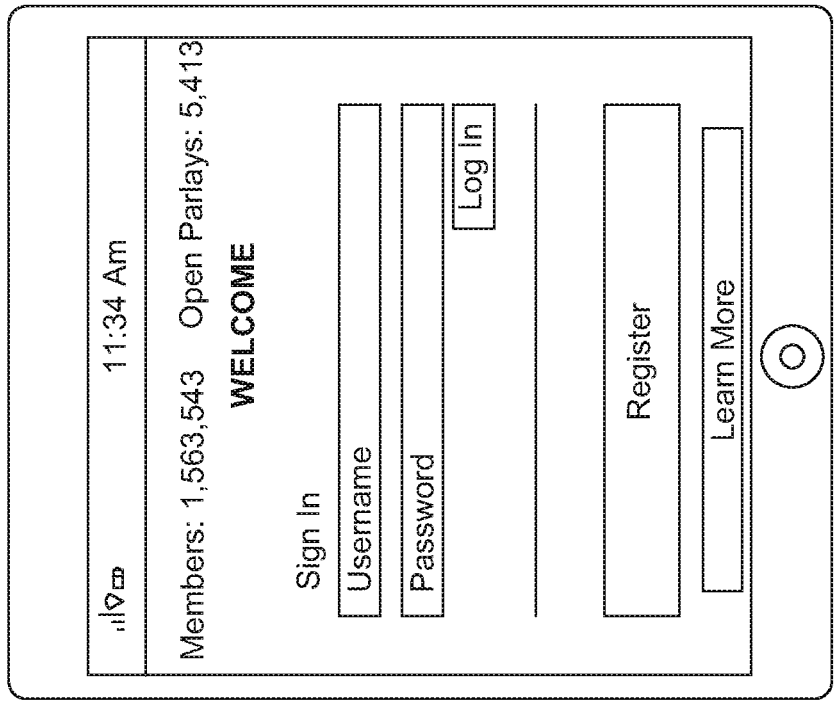
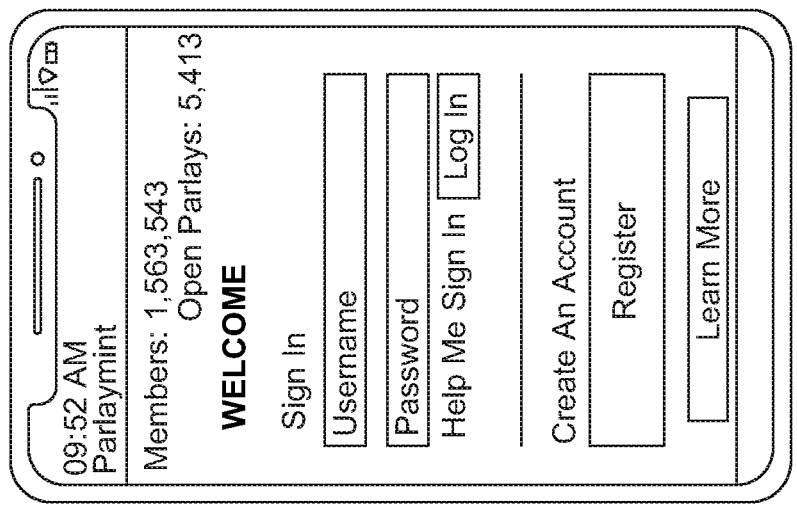
FIG. 17

SOCIAL CROWDSOURCED PARLAY GAMING SYSTEM AND METHOD

CROSS-REFERENCE TO RELATED APPLICATION

This application claims the benefit of U.S. Provisional Application No. 63/139,931 filed Jan. 21, 2021, entitled "Online and device based social sports gambling platform," the entire contents of which is incorporated herein by reference.

FIELD

The present disclosure is directed generally to wagering systems, and more particularly to a wagering platform where single bets are crowdsourced from registered users to form and submit parlay tickets.

BACKGROUND

A parlay ticket is a single betting wager with an exponential payout because it links together multiple individual bets. The larger the number of bets in a parlay ticket, the larger the payout, with exponential returns. A 3-bet parlay might pay 6 for 1, a 4-bet parlay might pay 10 for 1, and a 12-bet parlay might pay 3000 for 1. The risk for making the wager and receiving the large payout is that each and every individual bet within the parlay must win. If any of the individual bets making up the parlay loses, the entire parlay ticket loses. If any of the bets in the parlay pushes, the parlay reverts to a lower number of legs with the odds reducing accordingly.

Individual bets in a parlay can be based on one of the following bet types: against the spread, money-line betting, or under/over total points scored. An against-the-spread bet is a bet on a team in a sporting event such that the team's margin of victory in points must be above or below the published spread point value. A money-line bet is a bet that a team will win, with a payout based on their published odds of winning, and with no consideration to the margin of victory. In order to calculate the payout of these types of bets in a parlay, one must multiply out the payout for all games. For example, if 3 teams are −385 favorites, a successful parlay on all 3 teams winning would pay out at a ratio of approximately 1/1. This is because $(385/485)^3$ is approximately 50%. An under/over bet is a bet that the combined sum of the final scores in a sporting event is under or over a published total points value.

Parlay tickets have traditionally been offered through casino sportsbooks and their associated mobile apps, but can only be submitted by a single user. That is, a single user is responsible for selecting all of the individual bets in the parlay ticket.

It is with these limitations in mind, among others, that various aspects of the disclosure were conceived.

SUMMARY

The present disclosure is directed to a market gap for the creation of a unique betting platform where players are connected via a communication network for the purpose of publicly and privately crowdsourcing individual bets to form parlay tickets. Users participate in parlay tickets with published odds, supporting against-the-spread, money-line, and over/under bets, and when all individual bets of the parlay win, users share in the calculated winnings. Users coordinate with one another to place individual bets to complete a parlay ticket whereby each bet in the ticket is represented by a unique user. A user can start a new, public parlay by setting the price, the number of individual bets, and the allowed bet types that make up the parlay. As part of this process, they contribute the first bet to the parlay. A user can also join an existing parlay by submitting an individual bet within it. Users coordinate via the system and can choose to remain within a parlay, or drop out, based on the bets being added, as long as none of the sporting events related to bets within the parlay have started.

A user can also form groups of invited users to start and join parlay tickets whose entry is limited to the users of the group in which the parlay was formed.

Users can access the betting spreads, moneyline values, and point totals published for each sporting event on which they can bet, with the start dates and times of the sporting events presented. Users can view the odds that determine the payout for the parlay bets based on the number of individual bets. The minimum price of a parlay is $3, representing the lowest value of an individual bet in the parlay ($1) multiplied by the minimum number of bets allowed in a parlay (3) that can be formed in the system.

To entice user involvement and acquisition, the system is based on a beneficial-to-the-user twist: only those users whose individual bets lose must pay for the cost of the parlay ticket. In other words, as long as the user's individual bet wins or ties, they do not lose, and their cost of participating in the parlay is covered. For example, if 5 users each pay $5 to join a 5-bet, $25 parlay ticket, and 3 of those 5 users win their bets, the remaining 2 losing users equally pay to cover the cost of the parlay ticket. In this example, they would split the cost of the $25 ticket, and hence pay $12.50 each, while the 3 winning users pay $0. Conversely, when all of the individual bets in the parlay win, and hence the parlay ticket wins, the payout is exponential. In this example, a 5-bet parlay ticket may pay 25 for 1, meaning the users within the parlay each share in their portion of the $625 payout, potentially winning $125 for the $5 they initially wagered.

The hook for the consumer is that with one winning bet and additional coordinated bettors—they collectively can turn as little as $1 each, into a minimum of $6.50 each, with only a 3-bet parlay ticket. The payout values go up exponentially with a larger number of bets in a parlay ticket.

When the predefined number of bets in the parlay ticket have been locked in and the ticket is submitted, each player is initially charged the full cost of the parlay ticket and after the results of all of the individual sporting events representing the bets in the parlay are complete, will be refunded or remain deducted based on the outcomes of the individual bets.

Public Vs Private Parlays

Users have the ability to create and join public and private parlays. Public parlays are those in which all qualified platform users can participate, though public parlays may be limited to public users based on rank or profile. Users also have the ability to create groups of invited users for the purpose of forming private parlays consisting of bets that can only be submitted by users within the group.

The User Experience

Users will have the ability to start and join public parlays as well as parlays within groups to which they belong. Starting a parlay involves selecting the price, the number of bets, the type of sporting events allowed, and the type of bets allowed, as well as submitting the first bet into the parlay ticket. To join an existing parlay, players can use filterable lists to browse existing parlay tickets and their existing bets.

Users can then select to submit an individual bet to join an open parlay. All the individual bets within a parlay must be unique. As new individual bets are added to the parlay, the users that have placed bets in the parlay are notified so they can immediately decide whether to remain in the parlay or leave the parlay. If one or more users disapprove of the parlay ticket, they are removed from the ticket and the parlay becomes available for another bettor to add their individual bet. Players can choose to be notified of the various events occurring with the parlay tickets in which they are participating. For example, they can request to be notified of the status of the bets in the parlay or spread moves of the bets in the parlay.

Experience Points

Players receive experience points based on their participation and results. Experience points are derived from a combination of the bettor's average bet cost, frequency of betting, number of individual bets won, number of parlay tickets won and their size, and more. Experience points are used to move up through a ranking system. Each level related to experience points will have a unique name, for example Rookie, Regular, Sharp Shooter, etc. An algorithm will be configured to determine player movement within the ranking system. The further the player progresses in the ranking system, the more access they have to features, data, and contests presented by the system.

Financial Implications

Each time a user attempts to add a bet to a parlay ticket, whether by starting a new parlay, joining an existing parlay, or participating in a contest, the user's bankroll is queried for proper coverage of the entire cost of the parlay ticket. Users must have sufficient funds to cover the entire cost of the parlay ticket to cover the scenario in which they are the sole loser of the parlay. If a user does not have sufficient funds to cover the cost of the entire parlay ticket, they are prompted to add funds to their account. If a user removes themself from a parlay before the parlay has officially been submitted, their bankrolls are refunded the full amount that they submitted for the cost of the parlay. Players have immediate access to view existing funds in their account, can transfer funds from existing financial institutions to the platform, and can immediately withdraw funds and transfer them back to their connected financial account.

Additional Functionality

In one embodiment of the disclosure, an open parlay ticket with four or more submitted bets can be finalized for a lesser number of bets if the parlay ticket still has open bets based on its original definition, and yet the first sporting event represented in the ticket is approaching its start time. As such, this can be a setting when users create a new parlay, such as: "Allow this parlay to be approved for submission if a sporting event in the parlay is starting within 60 minutes and four or more legs have been filled." For example, a user starts a 10-bet parlay and only 8 bets are submitted, with one sporting event starting in an hour. The users are notified and asked if they would like to submit the ticket as an 8-bet parlay.

In one embodiment of the disclosure, participants in a parlay ticket can be offered to take a lesser payout. This offer is tendered when shortly after the results of the next-to-last bet in the parlay are confirmed and all bets, but the last bet in the parlay ticket, have won. The ordering of how these bets play out is based on the timing of the completion of the related sporting events. Players in the parlay must unanimously vote to take the lesser payout before the event related to the final bet in the parlay starts. Players can see each other's votes as they respond to the offer.

Free Play

To accommodate geographical regions where this form of gambling is not legal, the platform will support free play, where wins and losses equate to points won and lost and there are no monetary funds exchanged. Only free play will be supported in regions where this form of gambling is not legal. For those players in geographical regions where this form of gambling is legal, players will have the ability to participate in both free and wagered parlays, depending upon the sufficiency of funds in their account.

According to one aspect, a system for publicly and privately crowdsourcing individual bets to form parlay tickets may include a server computing device that receives realtime sports information associated with a plurality of different sports and sporting events including results and statistics that are received in realtime from a variety of different sources including multiple source server computing devices. Sports application programming interfaces (APIs) from one or more server computing devices may be used to provide real-time data including pre-match odds, live and final scores, and win, loss, and tie determinations, among other information. The information may be displayed to users and used to calculate parlay payouts. The live sports may include sports associated with men's and women's professional sporting leagues in the United States and throughout the world, as well as United States National Collegiate Athletic Association (NCAA) men's and women's college sporting leagues. Live sports may include but are not limited to soccer (football), American football, ice hockey, basketball, baseball, golf, UFC, boxing, tennis, auto racing, rugby, cricket, lacrosse, and chess. The server computing device may include a realtime parlay application that generates parlay tickets that may be shared with one or more users in a list of public parlay tickets or shared privately with other users. Each user may use their own client computing device or user device to place their own individual bet such the parlay ticket comprises multiple individual bets from multiple different users using different devices. The users may share in the winnings and also share in the cost of the parlay ticket if they do not win.

According to an aspect, a system includes a memory having instructions stored thereon and at least one processor to execute the instructions to determine information associated with a plurality of live sporting events in realtime, the live sporting events having human players and rules to determine a winner of each live sporting event, receive from a first client computing device of a plurality of client computing devices, a request to create a crowdfunded parlay comprising a selection of a create a crowdfunded parlay user interface element on a touchscreen user interface of the first client computing device, the crowdfunded parlay having a plurality of individual bets, each individual bet associated with at least one of the plurality of live sporting events, determine a first physical location of the first client computing device sent by the first client computing device, and confirm that the first physical location is a valid geographic location located within a particular geofenced area to create the crowdfunded parlay, receive, by the at least one processor, a first individual bet from the first client computing device associated with the at least one of the plurality of live sporting events comprising a selection of an individual bet user interface element on the touchscreen user interface of the first client computing device, the first individual bet having a first amount deposited by the first client computing device, determine a second physical location of a second client computing device of the plurality of client computing devices, the second physical location sent by second client computing device, and confirm that the second physical location is a valid physical location within the particular geofenced area to receive an individual bet, receive a second individual bet from the second client computing device associated with the at least one of the plurality of live sporting events comprising a selection of an individual bet user interface element on a touchscreen user interface of the second client computing device and add the second individual bet to the crowdfunded parlay, the second individual bet having a second amount deposited by the second client computing device, determine an outcome of the first individual bet and an outcome of the second individual bet based on an outcome of the plurality of live sporting events in realtime and transmit information associated with the outcome of the first individual bet and the outcome of the second individual bet to be displayed in realtime on the first client computing device and the second client computing device, and determine a result for the first individual bet and a result for the second individual bet and award a share of a parlay payout based on the result for the first individual bet and the second individual bet.

According to another aspect, a method includes determining, by at least one processor, information associated with a plurality of live sporting events in realtime, the live sporting events having human players and rules to determine a winner of each live sporting event, receiving, by the at least one processor, from a first client computing device of a plurality of client computing devices, a request to create a crowdfunded parlay comprising a selection of a create a crowdfunded parlay user interface element on a touchscreen user interface of the first client computing device, the crowdfunded parlay having a plurality of individual bets, each individual bet associated with at least one of the plurality of live sporting events, determining, by the at least one processor, a first physical location of the first client computing device sent by the first client computing device, and confirming that the first physical location is a valid geographic location located within a particular geofenced area to create the crowdfunded parlay, receiving, by the at least one processor, a first individual bet from the first client computing device associated with the at least one of the plurality of live sporting events comprising a selection of an individual bet user interface element on the touchscreen user interface of the first client computing device, the first individual bet having a first amount deposited by the first client computing device, determining, by the at least one processor, a second physical location of a second client computing device of the plurality of client computing devices, the second physical location sent by second client computing device, and confirming that the second physical location is a valid physical location within the particular geofenced area to receive an individual bet, receiving, by the at least one processor, a second individual bet from a second client computing device associated with the at least one of the plurality of live sporting events comprising a selection of an individual bet user interface element on a touchscreen user interface of the second client computing device and adding the second individual bet to the crowdfunded parlay, the second individual bet having a second amount deposited by the second client computing device, determining, by the at least one processor, an outcome of the first individual bet and an outcome of the second individual bet based on an outcome of the plurality of live sporting events in realtime and transmitting information associated with the outcome of the first individual bet and the outcome of the second individual bet to be displayed in realtime on the first client computing device and the second client computing device, and determining, by the at least one processor, a result for the first individual bet and a result for the second individual bet and awarding a share of a parlay payout based on the result for the first individual bet and the second individual bet.

According to an additional aspect, a non-transitory computer-readable storage medium includes instructions stored thereon that, when executed by a computing device cause the computing device to perform operations, the operations including determining information associated with a plurality of live sporting events in realtime, the live sporting events having human players and rules to determine a winner of each live sporting event, receiving, from a first client computing device of a plurality of client computing devices, a request to create a crowdfunded parlay comprising a selection of a create a crowdfunded parlay user interface element on a touchscreen user interface of the first client computing device, the crowdfunded parlay having a plurality of individual bets, each individual bet associated with at least one of the plurality of live sporting events, determining a first physical location of the first client computing device sent by the first client computing device, and confirming that the first physical location is a valid geographic location located within a particular geofenced area to create the crowdfunded parlay, receiving a first individual bet from the first client computing device associated with the at least one of the plurality of live sporting events comprising a selection of an individual bet user interface element on the touchscreen user interface of the first client computing device, the first individual bet having a first amount deposited by the first client computing device, determining a second physical location of a second client computing device of the plurality of client computing devices, the second physical location sent by second client computing device, and confirming that the second physical location is a valid physical location within the particular geofenced area to receive an individual bet, receiving a second individual bet from the second client computing device associated with the at least one of the plurality of live sporting events comprising a selection of an individual bet user interface element on a touchscreen user interface of the second client computing device and adding the second individual bet to the crowdfunded parlay, the second individual bet having a second amount deposited by the second client computing device, determining an outcome of the first individual bet and an outcome of the second individual bet based on an outcome of the plurality of live sporting events in realtime and transmitting information associated with the outcome of the first individual bet and the outcome of the second individual bet to be displayed in realtime on the first client computing device and the second client computing device, and determining a result for the first individual bet and a result for the second individual bet and awarding a share of a parlay payout based on the result for the first individual bet and the second individual bet.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein:

FIGS. 4A-17 show example screenshots/wireframes of example user interfaces associated with the system and displayed by a computing device according to an example of the instant disclosure.

DETAILED DESCRIPTION

Figure 1:
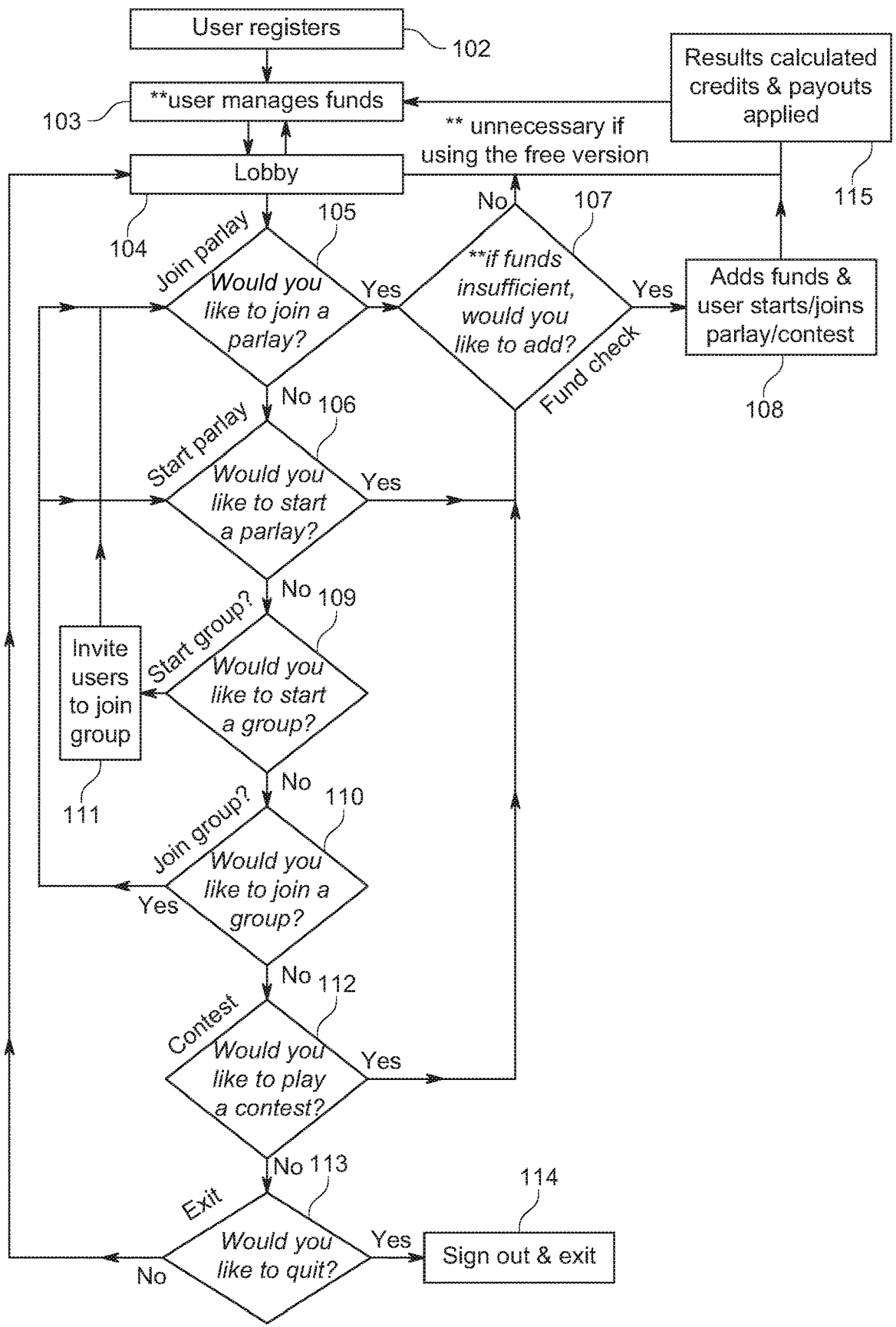
FIG. 1 is a flow diagram showing operations associated with implementing and operating a sports gaming system according to an example of the instant disclosure.

The present disclosure provides a social sports betting platform and method. In the preferred embodiment, the platform and method are implemented on one or more computer systems and/or networks. Particularly, the platform and method may be implemented using software, hardware, firmware or any combination thereof, as would be apparent to those of ordinary skill in the art, and the figures and examples provided are not meant to limit the scope of the present disclosure. Moreover, where certain elements of the present disclosure can be partially or fully implemented using known components and processes, only those portions of such known components and processes that are necessary for an understanding of the present disclosure will be described, and detailed descriptions of other portions will be omitted so as not to obscure the disclosure.

The following description will include: (I) a discussion of the general architecture and function of a social sports betting platform as shown in FIGS. 1 through 3 and FIGS. 18 and 19; (II) a detailed description of how a user may interact with the system in FIGS. 4A through 17; and (III) some examples of various embodiments of the sports wagering system corresponding to different types of sports betting in the remaining figures.

The wagering system summarized below allows for the crowdsourcing of individual bets to make up a parlay ticket whereby each individual bet in the parlay must be associated with a unique system user. One bettor can only contribute one bet to a single parlay ticket, but they can participate in multiple parlays tickets. Because current sportsbook sites and access points for betting do not provide a social gaming environment that allows individual bettors to coordinate with others, a need exists to provide a system that automatically hosts and facilitates a social betting platform that allows users to publicly and privately crowdsource individual bets used to form a parlay in real time with a plurality of users.

A user interface (UI), as used herein, comprises one or more display images, generated by a display processor and enabling user interaction with a processor or other device and associated data acquisition and processing functions. Data representing a UI design may be pre-stored in a repository or database in advance of execution and display thereof. The UI is caused to be displayed by combining the dynamic output processing code or executable applications (based on the information retrieved from the database) into the UI at runtime. The UI may also include an executable procedure or executable application. The executable procedure or executable application conditions the display processor to generate signals representing the UI display images. These signals are supplied to a display device which displays the image for viewing by the user. The executable procedure or executable application further receives signals from user input devices, such as a keyboard, mouse, light pen, wearable, touch screen or any other means allowing a user to provide data to a processor. The processor, under control of an executable procedure or executable application manipulates the UI display images in response to the signals received from the input devices, for example via a user's browser. In this way, the user interacts with the display image using the input devices, enabling user interaction with the processor or other device. The functions and process steps herein may be performed automatically or wholly or partially in response to user command. An activity (including a step) performed automatically is performed in response to executable instruction or device operation without user direct initiation of the activity.

As an example, a system such as a server may perform operations including determining, by at least one processor, information associated with a plurality of live sporting events in realtime, the live sporting events having human players and rules to determine a winner of each live sporting event, receiving, by the at least one processor, from a first client computing device of a plurality of client computing devices, a request to create a crowdfunded parlay comprising a selection of a create a crowdfunded parlay user interface element on a touchscreen user interface of the first client computing device, the crowdfunded parlay having a plurality of individual bets, each individual bet associated with at least one of the plurality of live sporting events, determining, by the at least one processor, a first physical location of the first client computing device sent by the first client computing device, and confirming that the first physical location is a valid geographic location located within a particular geofenced area to create the crowdfunded parlay, receiving, by the at least one processor, a first individual bet from the first client computing device associated with the at least one of the plurality of live sporting events comprising a selection of an individual bet user interface element on the touchscreen user interface of the first client computing device, the first individual bet having a first amount deposited by the first client computing device, determining, by the at least one processor, a second physical location of a second client computing device of the plurality of client computing devices, the second physical location sent by second client computing device, and confirming that the second physical location is a valid physical location within the particular geofenced area to receive an individual bet, receiving, by the at least one processor, a second individual bet from a second client computing device associated with the at least one of the plurality of live sporting events comprising a selection of an individual bet user interface element on a touchscreen user interface of the second client computing device and adding the second individual bet to the crowdfunded parlay, the second individual bet having a second amount deposited by the second client computing device, determining, by the at least one processor, an outcome of the first individual bet and an outcome of the second individual bet based on an outcome of the plurality of live sporting events in realtime and transmitting information associated with the outcome of the first individual bet and the outcome of the second individual bet to be displayed in realtime on the first client computing device and the second client computing device, and determining, by the at least one processor, a result for the first individual bet and a result for the second individual bet and awarding a share of a parlay payout based on the result for the first individual bet and the second individual bet.

Each client computing device associated with the plurality of client computing devices may determine its location using geolocation services and/or a GPS hardware device to confirm that the user is in a location where the particular form of sports gambling is legal. In addition, each client computing device may communicate with the plurality of client computing devices in real-time. Forming the parlay may facilitate collaboration and communication including real-time chat across legal international bettors.

Base Platform Functionality

FIG. 1 details an algorithm for creating and operating the social betting platform according to an example. In step 102, a system and method provides and implements a system enabling a plurality of individuals to gather for the purpose of collectively betting on the outcome of parlay tickets formed by selecting from a plurality of different bet types related to sporting events while risking actual money. As used herein, the terms user and player may be used interchangeably. A sporting event as used herein may refer to a bet corresponding to a live sporting event that is selected by a user and included in a parlay ticket. The system may include a server computing device having at least one processor to execute executable instructions that implement game features as described herein. Users can selectively access this server via any computing device including, but not limited to, a desktop computer, a laptop computer, a tablet computing device, a smartphone or any other hardware device that enables a user to remotely connect with a server over any type of communication network and whose location can be accurately determined.

The system enables users to register and create a password-protected user account that grants access to the various features of the system based on the user's location and the legality of this form of gambling in that location. As a registered user of the system, a user can: 1) start new parlay tickets and define their parameters, 2) join an existing parlay ticket that has already been defined by another user, 3) start and join groups with other invited users for the purpose of forming parlays with bets that can only be contributed by users in the group, and 4) participate in special events marketed by the system. While users can only submit one bet to any single parlay ticket, they can contribute to multiple parlay tickets. Users can form multiple groups and join multiple groups. Players receive experience points based on their participation in parlay tickets and their results. Experience points are derived from an algorithm combining the player's average bet cost, frequency of betting, number of individual bets won, number of parlay tickets won and their size, and more. Experience points are used to move up through a ranking system that, as a user progresses, provides additional access to features, data, and contests presented by the system.

The system provides users with the opportunity to view the betting details associated with each open, joined, or group parlay ticket and the individual details of the included sporting events. Upon the conclusion of the final sporting event included in a parlay ticket or contest, the system calculates and distributes the appropriate payouts to the players who contributed to the parlay.

In step 103, the system enables the user to manage an existing bankroll. Users can add and withdraw money to their bankroll to ensure they have sufficient funds to cover their bets. This can include but is not limited to accepting online payments from credit and debit bank cards, cryptocurrency, or cash from a kiosk, as well as transferring funds back to connected financial accounts.

In step 104, the system enables the user to enter a virtual lobby. Controls are available within the lobby that enable the user to: a.) join existing public parlays; b.) start new public parlays; c.) form groups; d.) join groups; and e.) participate in special contests. Secondary options are also available, such as but not limited to viewing and updating account settings, learning about betting and the rules for winning and losing in the system, and getting support.

In step 105, the system enables the user to join a parlay. In this instance, the user can view the parameters of the parlay they want to join. The parameters include but are not limited to the price of the parlay ticket, the types of sporting events and bets allowed, the number of individual bets necessary to complete the parlay, the unique individual bets submitted by other users that are already included in the parlay ticket, and the maximum payout. Filters are available that allow the user to view a subset of the list of all the open public parlays that are available to join. These filters include but are not limited by selecting specific teams, specific bet types, or specific sports. Joining the parlay takes place when the user submits their individual bet and the financial transaction is successful. The parlay remains open until the users have contributed the predetermined number of individual bets to complete the parlay ticket. The moneyline odds, over/under point totals, and point spreads for each individual bet are not assigned until the parlay has officially been submitted. As individual bets are added to a parlay, the users who have placed bets in the parlay are notified so they can immediately decide whether to remain in the parlay or leave the parlay. If one or more users disapprove of the parlay ticket, they are removed from the ticket and the parlay becomes available for another player to add their individual bet. Once all the users that have submitted individual bets in the parlay agree, or, the parlay ticket automatically reverts to a lesser number of bets, the parlay ticket is submitted.

In step 106, the system enables the user to start a public parlay. Starting a public parlay gives the user the opportunity to specify the settings for the parlay ticket. In this instance, the user has controls and fields to define the price for the parlay ticket (and consequently the cost of each individual bet), the number of bets for the parlay, the type of sporting events that can be included, the type of bets allowed (against-the-spread, moneyline, or over/under, among others), and the parameters with which the parlay should be submitted. Starting the parlay takes place when the user defines the parameters of the parlay ticket, chooses an individual bet as the first in the parlay, and successfully submits the appropriate payment. The system and method makes the new parlay ticket available for others to join—whether publicly, or as part of a group, as defined. Any user can remove themselves from a parlay ticket at no cost at any time before the parlay ticket has been officially submitted. Players in the parlay are notified as bets are added and removed from the parlay and the parlay ticket remains open and available for others to join until either: 1) all players have agreed to each of the bets in the parlay ticket and the ticket consists of the number of bets as originally defined, or 2) the parlay is automatically submitted based on parameters defined when the parlay started.

In step 109, the system enables the user to start a group. Users have the ability to create groups of invited users for the purpose of forming private parlays consisting of bets that can only be submitted by users within the group. To start a group, the user must invite users and the users must agree to register in the system and join the group. Users can only join a group (step 110) if they are invited by an existing member of the group. If group members are to participate in monetized parlay tickets, they must be using the system while located in a geographic region where such forms of sports gambling are legal. Once a group is formed, participants of the group have the ability to start and join parlays that are limited to players within the group. The ability and limitations to starting and joining parlays in a group are otherwise no different from starting and joining public parlays.

In step 112, the system enables users to participate in special, limited time contests. These contests may include special parlay tickets and payouts, group competitions, and head-to-head showdowns, among others. As with starting and joining any parlay, participating in a contest requires verification of the appropriate funds to cover the cost of participation in the event of maximum losses (step 107), and taking steps as necessary to provide sufficient funds before the bet is submitted.

In step 115, the system automatically calculates the results of parlay tickets and special contests immediately following the completion of the final sporting event included in the timeline of events related to bets that are part of the parlay ticket or contest. Because players are required to pay for the full price of any parlay ticket they enter, players with winning bets are eligible to receive a full refund for their participation, as well as a portion of the parlay ticket payout in the event the entire parlay ticket won.

If all the Bets in the Parlay Win

If all the bets in the parlay ticket win, each player is awarded their share of the parlay payout. For winning parlays containing against-the-spread and/or under/over bets, each player is awarded an equal share of the parlay payout. For winning parlays containing moneyline bets, the shares of the parlay payout are proportionally divided based on the published moneyline values associated with the users' bets. The payout is immediately added to the individual players' bankrolls upon the completion of all sporting events related to the bets in the parlay ticket. For example, suppose you are part of a winning, $25, 5-bet parlay (e.g., participants paid $5 each to join), where each bet was an against-the-spread or under/over bet. With published odds for a 5-bet parlay at 25:1, each participant shares in the $625 payout. This will result in a $20 credit back to each player's account (to account for the original cost of the ticket minus their individual portion), as well as a payout reward of $125, resulting in a profit of $120 for a 2400% return on $5.

If One or More Bets Win or Push, and at Least One Bet in the Parlay Ticket Loses If one or more bets do not win, players that win or push their individual bets are not responsible for covering the cost of the ticket and will therefore be refunded the original price of the ticket. (Remember, each player must pay the full price of the parlay ticket upon submitting their bet to ensure they have funds enough to cover the scenario where they are the sole loser in the parlay.) Only the losing players in the parlay collectively and equally cover the cost of the original parlay ticket, resulting in only a partial credit to their account in return, in order to share in the cost of the parlay ticket. For example, if your bet is one of three winning bets in a $25, 5-bet parlay similar to that described in the example above, the two losing players are responsible for covering the $25 parlay ticket resulting in a $25 credit to your account and the accounts of the other winning players, while the two losing players are only credited back $12.50, sharing in the cost of the ticket.

If all the Bets in the Parlay Lose

If all bets in the parlay ticket lose, each player simply shares in the original cost of the parlay ticket, and is partially refunded the ticket amount they originally paid. For example, if all bets have lost in a $25, 5-bet parlay similar to that described in the example above, all 5 players share in the cost of the $25 ticket, resulting in a credit of $20 back to each player in the parlay.

If Your Bet Pushes and Everyone Else Wins

If a player ties their bet and everyone else's individual bets in the parlay ticket win, the player does not lose. However, the player does not win either. The player's bet is removed from the parlay ticket, the player is are credited the original cost of the parlay ticket, and the remaining participants of the parlay split the resultant winning payout associated with a parlay of lesser size. For example, if one bet pushes in a $25, 5-bet parlay similar to that described in the example above, the remaining four winning players share in the proceeds from the payout associated with a $20, 4-bet parlay ticket, while the player who pushed is refunded their full entry price for the parlay ticket.

EXAMPLES

Example 1: User NFLFanTom Joins a Parlay

User NFLFanTom registers and deposits $100 from his bank's debit card as a starting balance. NFLFanTom heads to the virtual lobby to browse the list of open public parlays and uses the filters to narrow the list of the preferred open public parlays to join. NFLFanTom identifies a $25, 5-bet parlay ticket he would like to join and submits his unique individual bet: Minnesota Vikings vs Green Bay Packers—he is taking the under based on the published over/under points total. The cost of the entire parlay ticket is $25, or $5 per person. When NFLFanTom submits his bet, the system checks that he has sufficient funds and since he does, the full $25 is deducted from his bankroll. NFLFanTom is notified as each remaining individual bet is added to the parlay, and is given the opportunity to drop out of the parlay. This process continues until all five bets have been approved and added to the parlay. NFLFanTom and the four other players that contributed to the parlay ticket are notified that the parlay is now filled. NFLFanTom and the other users wait for the results of the sporting events on which they collectively bet. The sporting events play out and the results of the individual bets are known and available in realtime and tabulated based on the final score and the point spread. The final score was 31:14 Vikings:Packers with a published point total for the over/under defined at 48. NFLFanTom won his bet, since he bet the under, but unfortunately, two players who contributed their bets to the parlay ticket were less fortunate and their bets did not win. The parlay ticket is not a winner. With 3 winning players and 2 losing players, the system reimburses NFLFanTom and the other two winning players for the $25 they initially paid because their bets won. The system charges the two users that lost by reimbursing the two players the difference between the initial cost of the parlay ticket ($25) and the split cost of the ticket divided by the number of losing players (in this case $25 divided by 2 or $12.50). The two losing users are reimbursed $25–

$12.50=$12.50, while the three winning users are reimbursed the full $25 ticket fee.

Example 2: User NFLFanTom Starts a Parlay

User NFLFanTom selects to start a new public parlay. He selects to open a $40 parlay with 8 bets limited to against-the-spread and over/under bets for only NFL games occurring over the weekend. Additionally, he has set this parlay up so that if all of the bets are not filled, it will revert to, at the least, a six-bet parlay ticket. He adds his bet—Minnesota Vikings −4 vs Green Bay Packers—and selects to submit the new parlay. When NFLFanTom submits his bet, the system checks that he has sufficient funds and since he does, the full $40 is deducted from his bankroll. NFLFanTom is notified as each remaining individual bet is added to the parlay, and is given the opportunity to drop out of the parlay. This process continues until all eight bets have been approved and added to the parlay, except this time, with only five minutes remaining until kickoff of the first sporting event, only seven bets within the parlay have been filled. The parlay ticket is submitted automatically with only seven bets and each player in the parlay is immediately refunded $5 since the eighth $5-bet was never filled. NFLFanTom and the six other players that contributed to the parlay ticket are notified that the parlay has been submitted with this lesser amount of bets and the ticket is submitted as a 7-bet parlay ticket payout at odds 100:1. NFLFanTom and the other users wait for the results of the sporting events on which they collectively bet. The sporting events play out and the results of the individual bets are tabulated based on the final scores and the point spreads. The Vikings beat the Packers by 7, enough to cover the 4-point spread. Additionally, the six other individual bets also won. The parlay ticket is a winner for a maximum payout of $3500. The seven users equally divide the payout, each receiving $500. The system reimburses each of the 7 players including NFLFanTom for $30 of the $35 they initially paid to play, and additionally pays out $500 to each of them resulting in a $495 profit.

Example 3: User NFLFanTom Forms a Group

User NFLFanTom forms a group of friends that also like to bet on sports. He uses the system to send personalized invitations via email, text message, or push notification to his friends and/or shares a unique code that can be used to join the group. As a result, 10 friends, some of whom were already registered in the system, and others who were not, register in the platform and join the group. As the group owner, NFLFanTom has full control of who can be invited into the group. Once members have joined the group, members, including NFLFanTom, can start or join parlay tickets that are formed exclusively with bets provided by members of the group.

Example 4: User NFLFanTom is Offered an Opportunity to Secure a Win

User NFLFanTom is among 8 users in a $40, 8-bet parlay with a maximum payout of $5600. Seven of the eight bets in the parlay have won and there are two hours before the last sporting event related to the final bet starts. The system sends a notification to each of the 8 users requesting to vote whether to accept the lesser payout offered, in this case $3000, or let the final bet play out as initially planned. User NFLFanTom and the seven other players all agree to take the lesser payout. Had one person not agreed, the offer would have been null and void, and they would all wait for the results of the final sporting event. Since all agreed to take the lesser amount ($3000), while only seven of the bets contributed to the win, all eight players share the winnings. That is, NFLFanTom and the other 7 players are each refunded $35 of the $40 they initially paid to get into the parlay ticket and they will individually receive an additional payout of $3000/8=$375 per person.

System Architecture

Figure 2:
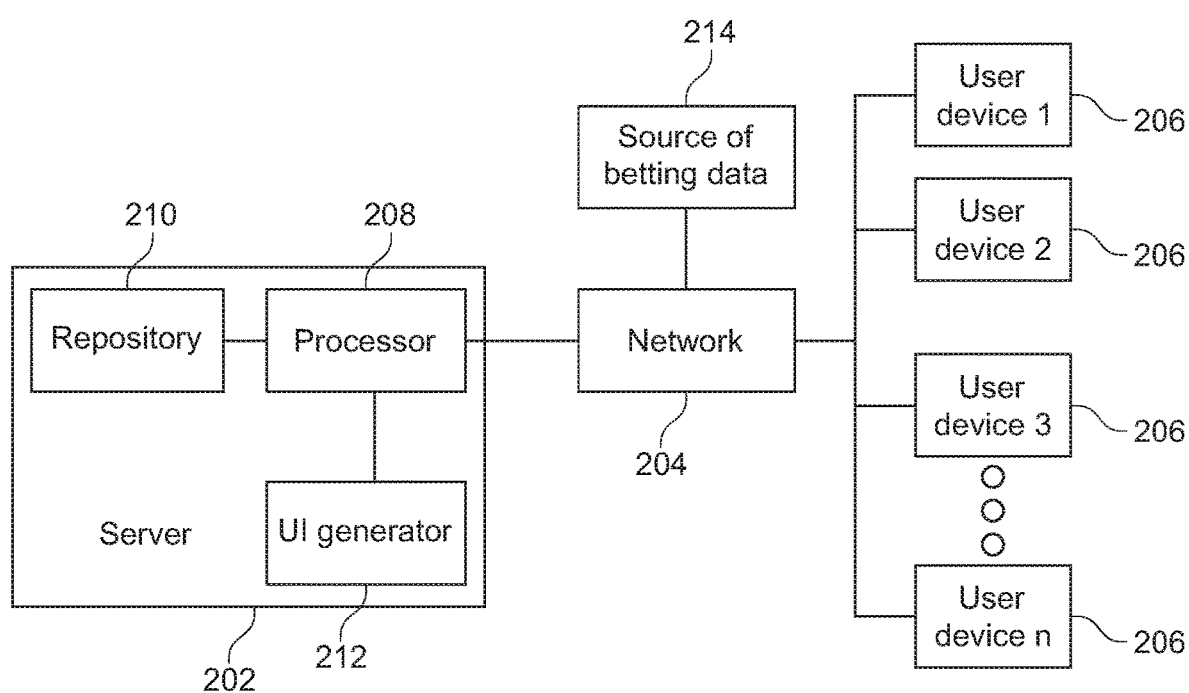
FIG. 2 shows a block diagram of the sports gaming system according to an example of the instant disclosure.

FIG. 2 is a block diagram of the system according to an example of the instant disclosure. The hardware shown and described herein is able implement the instructions described above with respect to FIG. 1 which represents an algorithm for creating and operating the system. The system includes a server (202) that is connected via a communication network (204) to a plurality of user devices (206). While only three user devices are described herein, it is apparent that any number of user devices may connect to the server (202) via communication network (204). The user devices (206) allow users to transmit and receive data associated with the system in order to engage with the platform as described above. User devices (206) include at least one of a computer, a tablet, a smartphone, or any other device able to receive input from a user and transmit data corresponding to the user input for receipt by the server (202) as well as receive requested data from the server (202) while verifying the location of the user device (206).

The server (202) includes a processor (208), a repository (210) and a user interface generator (212). The repository (210) includes a plurality of instructions stored therein that direct the operation of the system. The instructions may be in the form of machine executable code that are able to perform the functions described herein above with respect to FIG. 1. When an activation of a particular feature is requested, the processor (208) executes the instruction corresponding to the particular feature that is stored in the repository. Upon execution and activation of the feature, the processor conditions the user interface generator (212) to generate a display image for display to at least one user that allows the user to make use of the particular feature. The system is also in communication with an external source of betting data (214) from which category of bets, types of bets and parameters of bets may be obtained for use during engagement with the system. Alternatively, betting data may be stored locally in the repository (210) or acquired from external source (214) and cached in the repository (210). Examples of data retrieved from external sources includes sporting event data such as the teams involved, the times and dates of the sporting events, the current scores, the betting odds and values for against-the-spread, moneyline, and over/under bets, and sporting event results data that provides the ability to calculate the results of the wagered parlay tickets.

The server (202) may have computer readable media and may include volatile media, nonvolatile media, removable media, non-removable media, and/or another available medium that can be accessed by the processor (208). By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The processor (208) executes an initial instruction which conditions the user interface generator (212) to generate a home page for presentation to at least one user upon the user accessing the system at an address on the communication network or within a dedicated mobile app. An example is a home page encoded in a particular data format (e.g. HTML, with JavaScript and CSS) that is selectively accessible by users via a web address using communication protocols such as TCP/IP and HTTP. Alternatively, the user interface generator (212) may send information to the user device (206) for display by an application such as a mobile application or other native application executed by the user device.

The communication network (204) can be the Internet, an intranet, or another wired or wireless communication network. For example, the communication network 106 may include a Mobile Communications (GSM) network, a code division multiple access (CDMA) network, $3^{rd}$ Generation Partnership Project (GPP) network, an Internet Protocol (IP) network, a wireless application protocol (WAP) network, a WiFi network, a Bluetooth network, a satellite communications network, or an IEEE 802.11 standards network, as well as various communications thereof. Other conventional and/or later developed wired and wireless networks may also be used.

The mobile application may be a component of an application and/or service executable by the at least one server (202) and/or the at least one user device (206). For example, the mobile application may be a single unit of deployable executable code or a plurality of units of deployable executable code. According to one aspect, the repository (210) may include one component that may be a web application, a native application, and/or a mobile application (e.g., an app) downloaded from a digital distribution application platform that allows users to browse and download applications developed with mobile software development kits (SDKs) including the App Store and GOOGLE PLAY®, among others.

System Site Map

Figure 3:
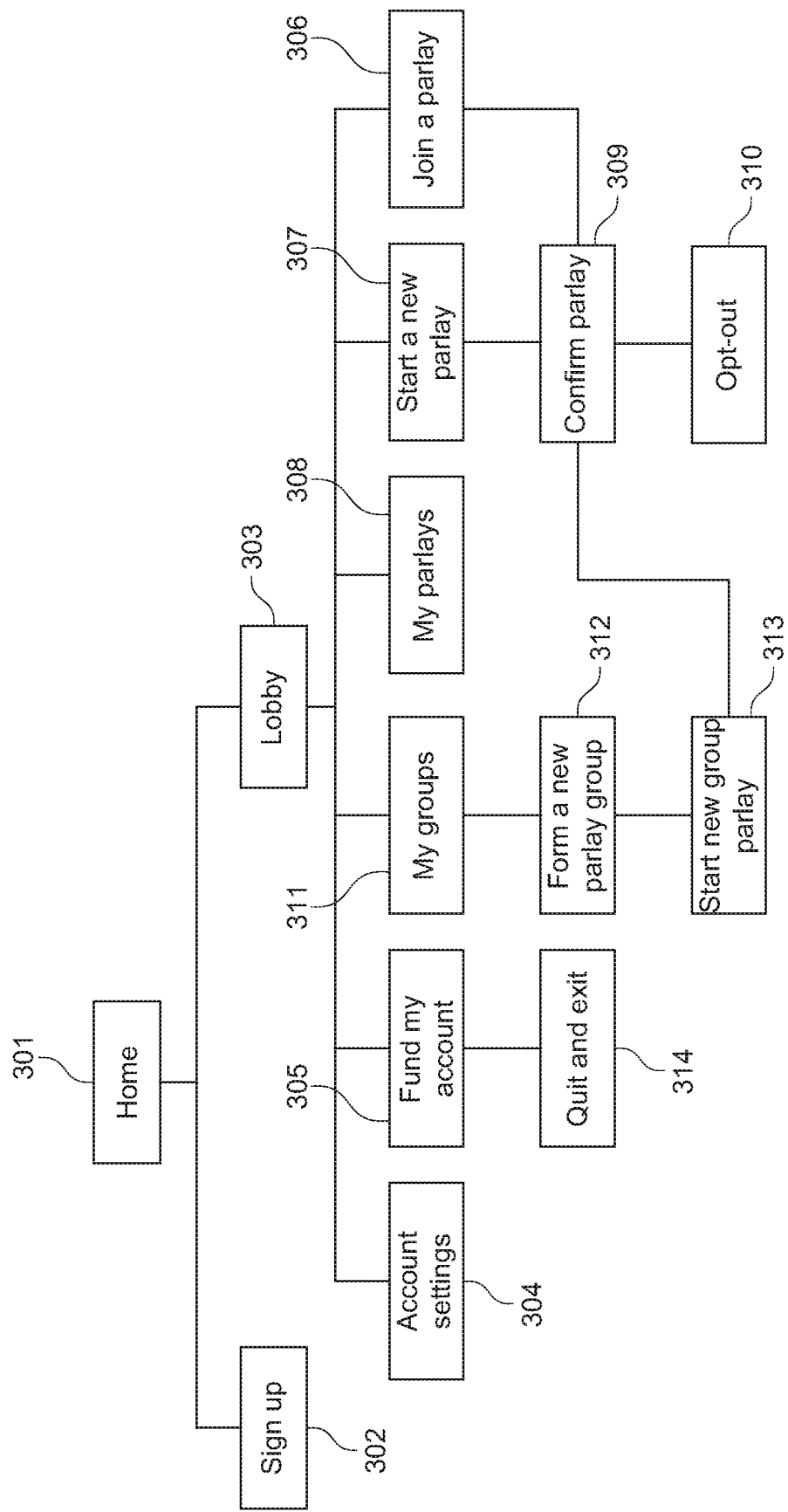
FIG. 3 is an exemplary block diagram representing a site map for a digital presence for the platform for at least one user according to an example of the instant disclosure.

FIG. 3 is an exemplary block diagram representing a site map for a digital presence for the platform for at least one user according to an example of the instant disclosure. A site map provides a look at the landscape of a digital presence and represents the anticipated navigation flow for users. The Home block (301) represents the default interface where users land when they initially arrive at the platform prior to signing into the system with their unique credentials. The default interface is the gateway for users of the system to log into their accounts and learn more about the system. The default interface will assist all types of users—from the completely uninformed to the experienced bettor—in becoming educated about how to use and succeed at participating in the platform. This includes but is not limited to learning about the basics of sports betting and parlay tickets, learning how to get help about the abuses of gambling, and getting support.

The Sign Up block (302) represents the interface that users can use to register within the system. The Lobby block (303) represents the virtual home for registered users. From the lobby, users can navigate the main platform options. The Account Settings block (304) represents the interface where users can view and adjust their system profile settings and identifiers. The Fund My Account block (305) represents the interface where users can add and manage their bankroll. This includes but is not limited to providing methods for users to add and remove funds to and from their bankroll through financial transactions with connected financial institution accounts. The Join a Parlay block (306) represents the interface where users can view and filter the list of open public parlays that are available to join. From here, users can join a parlay ticket by submitting an individual bet within the parlay. The Start a New Parlay block (307) represents the interface where users can start a public parlay. Starting a public parlay gives the user the opportunity to specify the settings for the parlay including but not limited to the parlay price, the number of bets included, and the sports on which users can bet. The My Parlays block (308) represents the interface where users can view and manage the parlays in which they are participating. The Confirm Parlay block (309) represents the interface where users can confirm that they individually agree to the specifications of the parlay and the selections of their individual bet and can choose to submit the parlay or exit and abandon the parlay. The Opt-Out Offer block (310) represents the interface where users can opt out for a lesser, guaranteed payout. The My Groups block (311) represents the interface where users can view and manage the groups to which they belong. The Form a New Parlay Group block (312) represents the interface where users can add and manage a new group. The Start a New Group Parlay block (313) represents the interface where users can start a new parlay ticket within one of their groups. The Withdrawal From Acct block (314) represents the interface where users can withdraw their funds and exit the platform.

User Interface

Figure 4C:
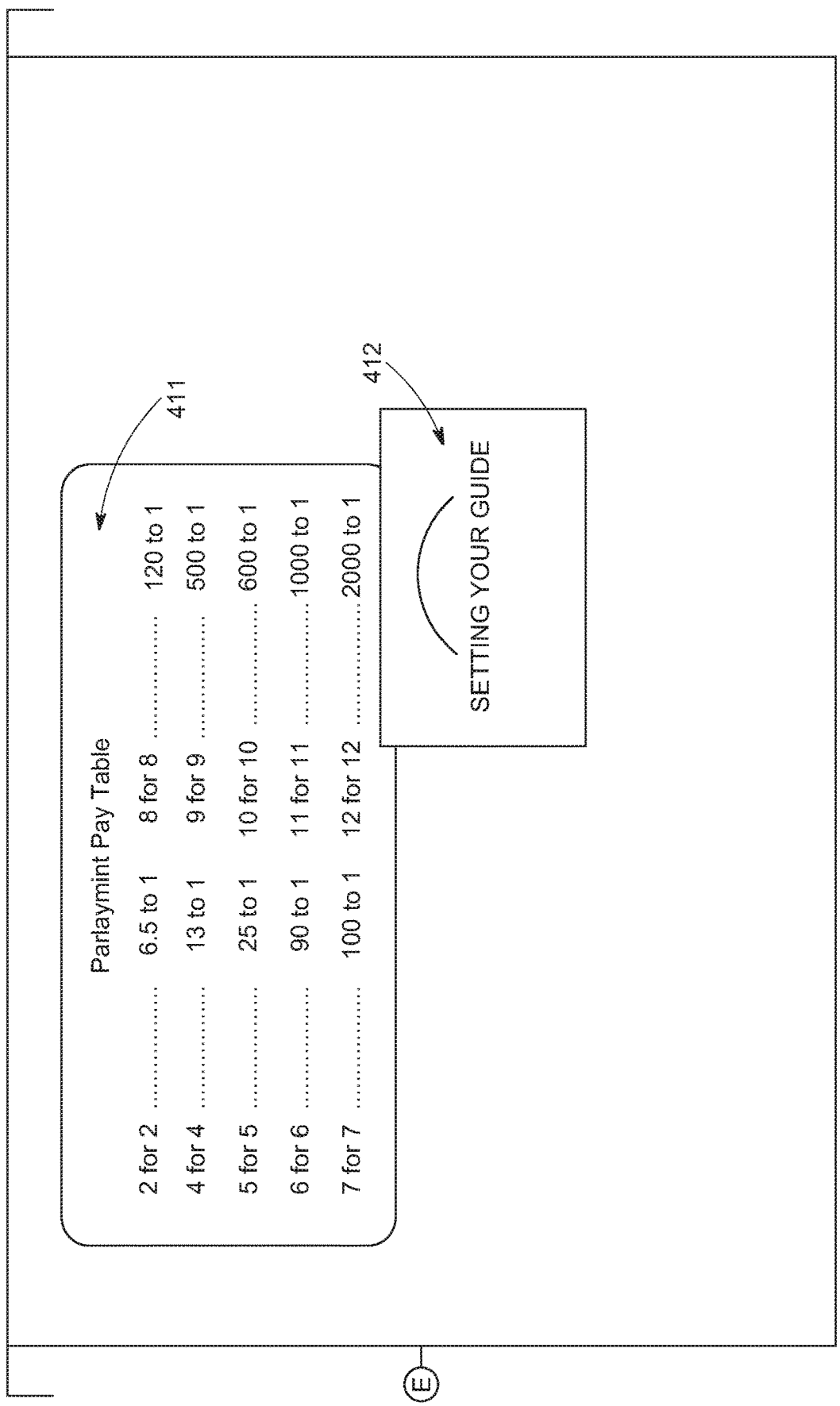

FIG. 4 is an exemplary wireframe of a default interface as represented by Home block (301) and generated by the system for display to at least one user who has not yet logged into the system according to an example of the instant disclosure. The home page provides a gateway for users of the system to explore betting information, log into their accounts, and initiate additional system functions based on user input from user devices (206). The default interface includes an About Us user-selectable image element (401) that, when selected, provides additional information about the platform and the rules of play. The default interface includes a Locations user selectable list element (402) that, when selected, provides the user with information about the locations where it is legal to play for money. The display image includes a Support user selectable list element (403) that, when selected, provides details about how to get assistance. The display image includes a Username user input field (404), a Password user input field (405), and a Sign In button (406) that allow users to securely access the platform. The default interface further includes a call-to-action button (407) that allows users to sign up to begin participation in the platform, along with the Join a Parlay button (408), the Start a Parlay button (409), and the Form a Group button (409), that prompts users to first register within the platform (500) and then continue to navigate the user to the interface blocks represented by 306, 307, and 312, respectively. In addition, the home page further includes the odds text table (411) to provide odd based information for the payoffs for each parlay based on the number of bets they can include, and the image link (412) that links users to additional information to learn about sports betting.

FIG. 5 is an exemplary wireframe of a sign-up interface as represented by Sign Up block (302) and generated by the platform for display to at least one user according to an example of the instant disclosure. The sign-up interface provides for users of the platform to sign up and register for access to the platform based on input by users using user device (206). The sign-up interface can include user input fields (500) and the Join Now button (501) for providing required information and sending the information to processor (208). Unregistered users will arrive here first, after attempting to select any of the buttons 407, 408, 409, or 410.

Figure 6A:
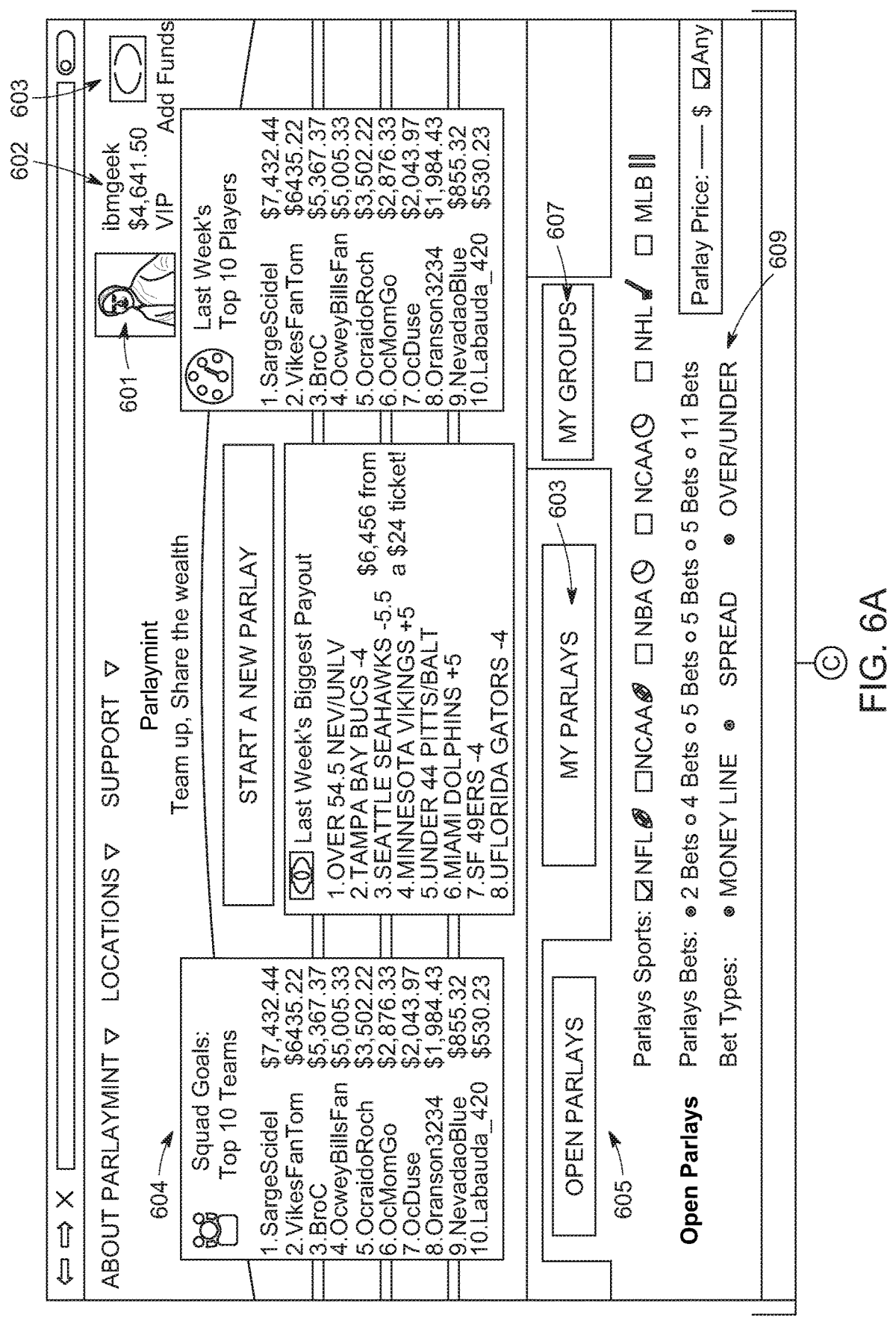
Figure 6B:
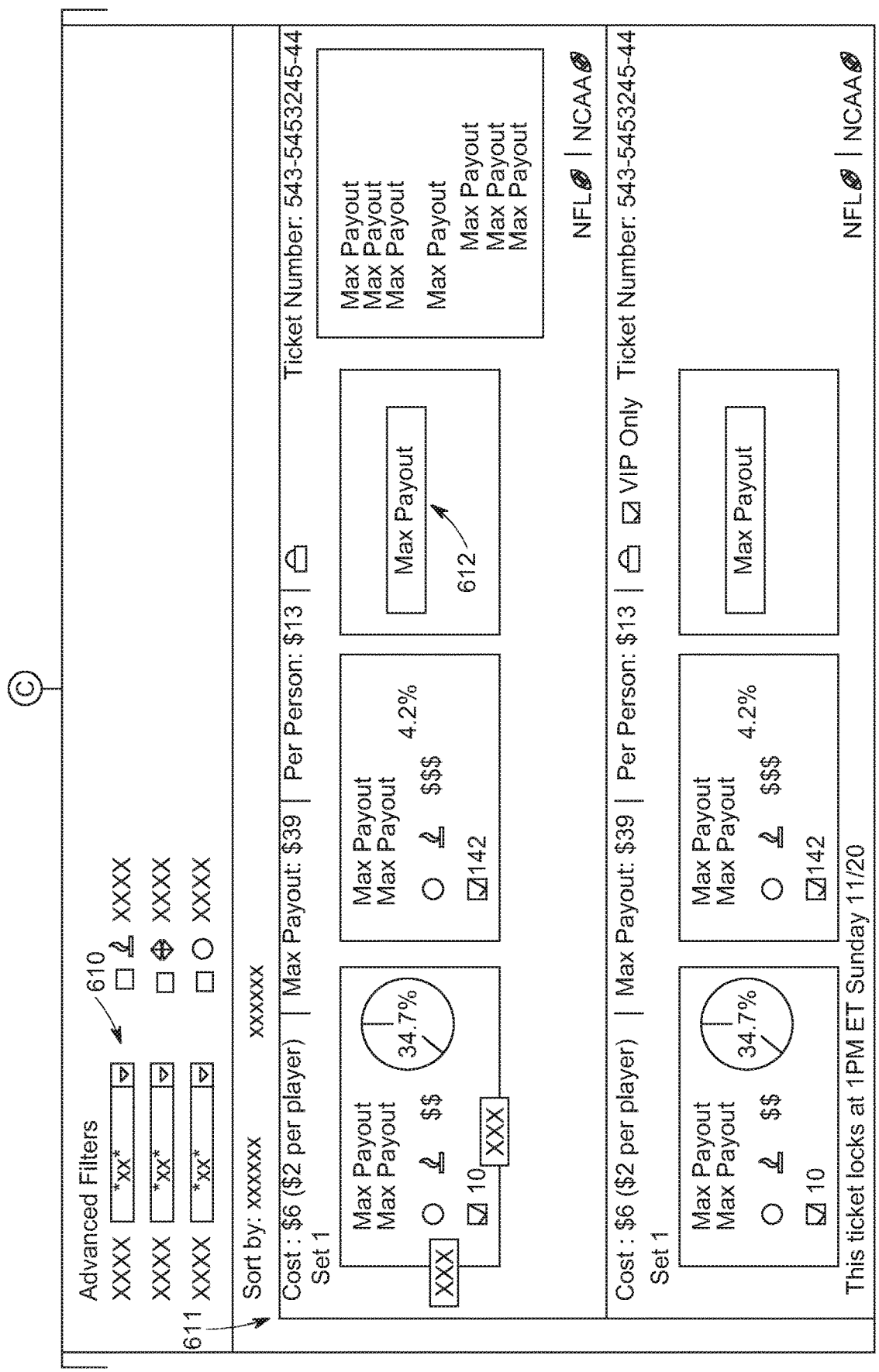

FIG. 6 is an exemplary wireframe of a lobby as represented by Lobby block (303) and generated by the platform for display to at least one user according to an example of the instant disclosure. Once the username and password are entered in their respective fields and submitted, the processor (208) receives the user credential data and authenticates the entered data with user profile data stored on repository (210). Once authenticated, the user can access all of the main public functions of the platform, including but not limited to viewing and updating an authenticated user's avatar or picture (601), bankroll and account settings (602), and access and manage the bankroll (603). The lobby also contains a Start a Parlay button (604) for users to quickly get started. Users can view the list of open public parlays (611) when the Open Parlays button (605) is selected. Users can narrow the list of parlays using the filters (509), the parlay price slider (608), and the advanced filters (610). When users are ready to submit a bet and join a parlay, they select the Join Parlay button (613). Users can view the parlays that they have joined when they select the My Parlays button (606). Users can view the groups they belong to and their group parlays when they select the My Groups button (607).

FIG. 7 is an exemplary wireframe of a join-a-parlay interface as represented by Join a Parlay block (306) and generated by the platform for display to at least one user according to an example of the instant disclosure. The join-a-parlay interface provides for users of the platform to add their bet to a public parlay ticket, including but not limited to verifying the parameters of the parlay, selecting a bet or letting the system select a bet, and agreeing to place the bet within the parlay. Users use the options in (701) to have the system select the corresponding bet for them, and the select button (702) to add the bet to the parlay. The join-a-parlay interface also contains the list of current sporting events and available bets (703) from which users can browse and select their bet. Additionally, users use the notification options (704) to configure notification settings associated with the parlay. Users select the Place My Bet button (705) when they are ready to submit their bet to the parlay.

Figure 8A:
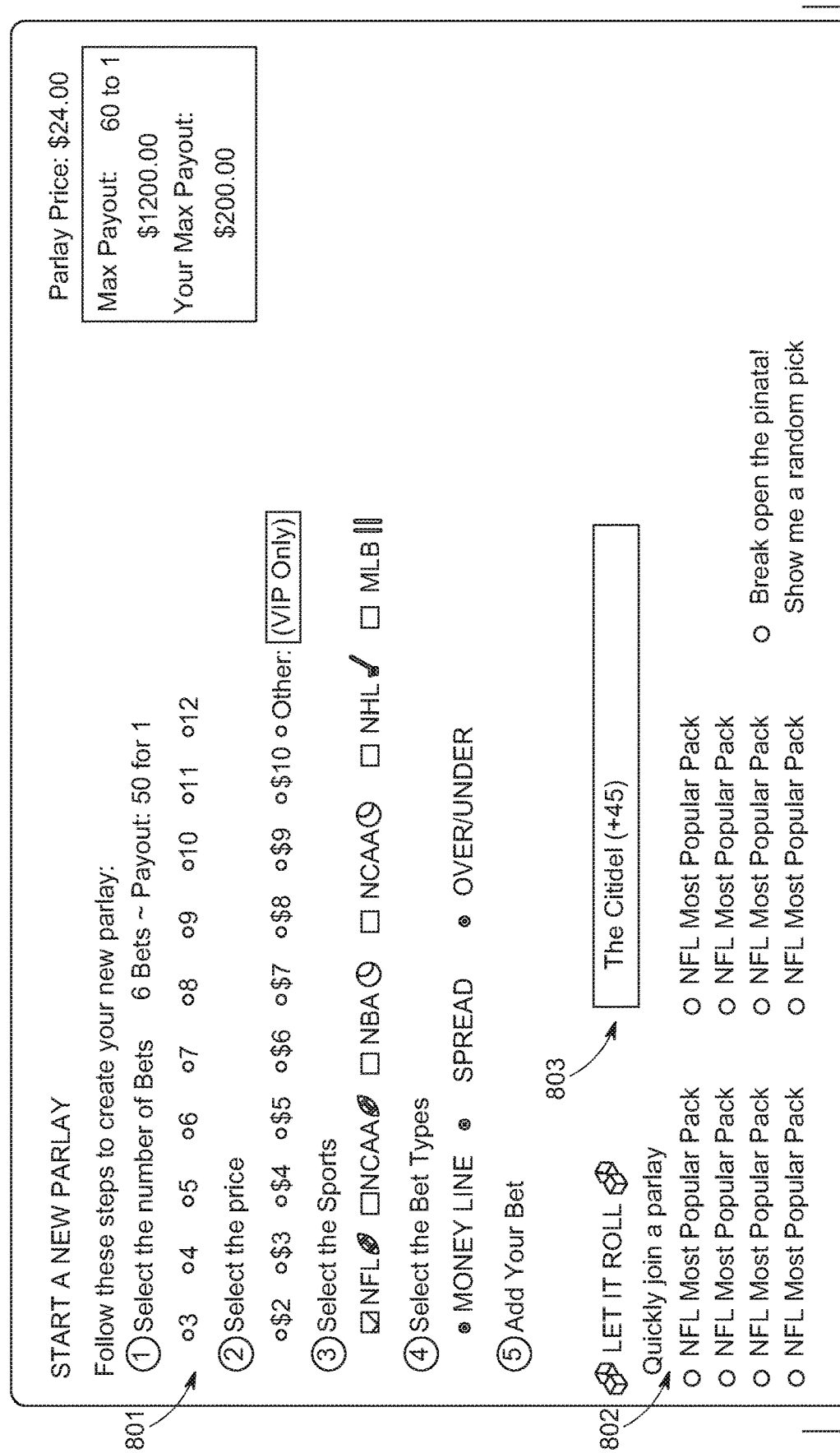

FIG. 8 is an exemplary wireframe of a start-a-new-parlay interface as represented by Confirm parlay block (309) and generated by the platform for display to at least one user according to an example of the instant disclosure. The start-a-new-parlay interface provides for users of the platform to specify the parlay ticket settings, add their bet, and make the parlay ticket available for others to join. Users specify settings (801) to set up the parlay that they want to start. Users then use the options in (802) to have the system select the corresponding bet for them, and the select button (803) to add the bet to the parlay. The start-a-new-parlay interface also contains the list of current sporting events and available bets (804) from which users can browse and select their bet. Users can specify notification options (704) to configure notification settings associated with the parlay. Additionally, users use the hedge option (805) to configure whether to allow the participants in the parlay to opt-out for a lesser, guaranteed payout. Users select the Confirm Parlay button (806) when they are ready to open the parlay ticket and make it available for others to join.

Figure 9:
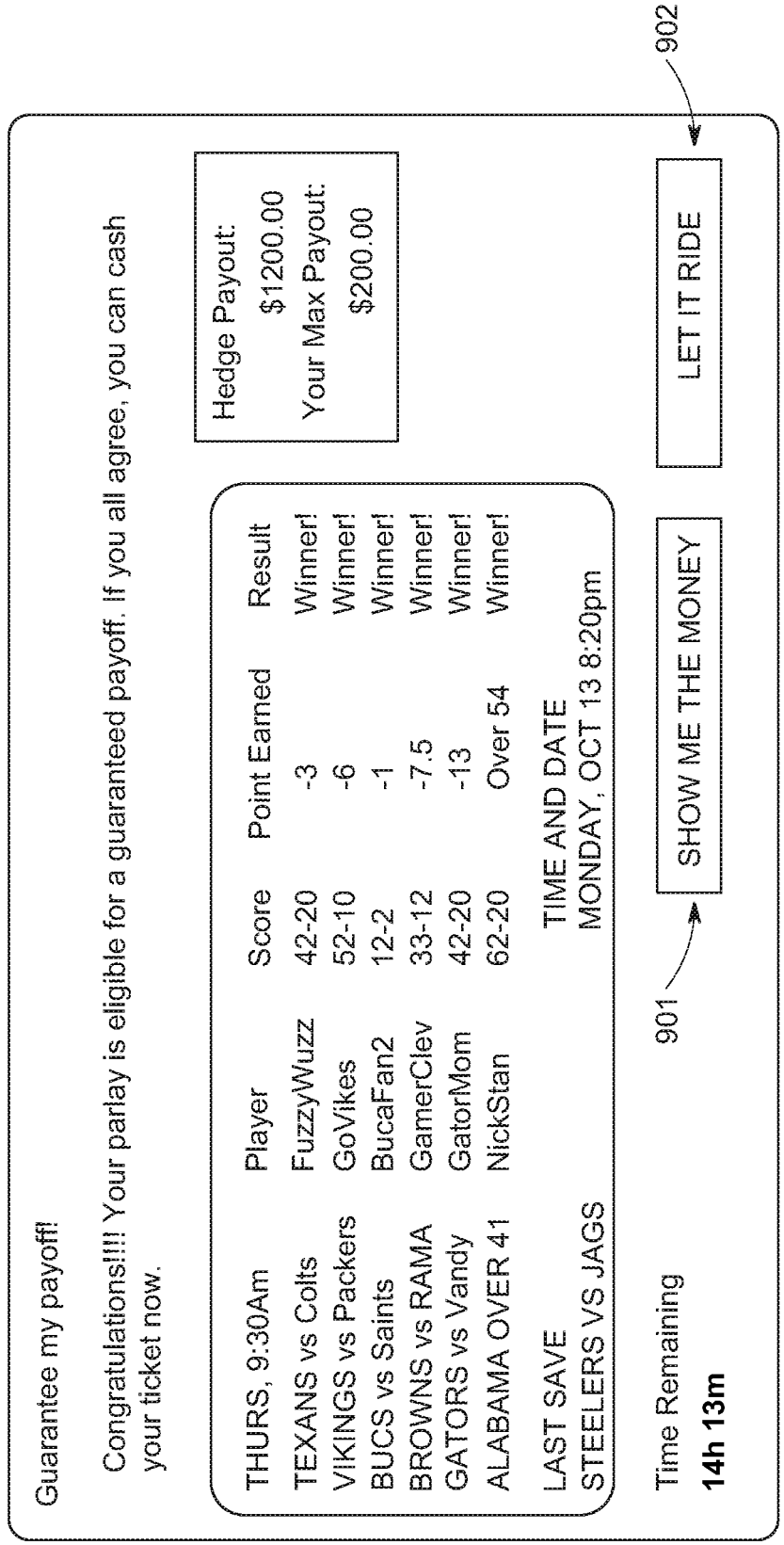

FIG. 9 is an exemplary wireframe of an opt-out interface as represented by Opt-Out block (310) and generated by the platform for display to at least one user according to an example of the instant disclosure. The opt-out interface provides for users of the platform to vote on whether to accept an offer for a lesser, guaranteed payout when all but one bet in the parlay ticket has been won and the final event has not yet started. The vote to opt-out must be unanimous among all the participants of the parlay. Users select either the yes button (901) to vote to collect the guaranteed payout, or the no button (902) to disapprove the offer to opt-out and allow the parlay ticket to play-out as originally planned.

Figure 10A:
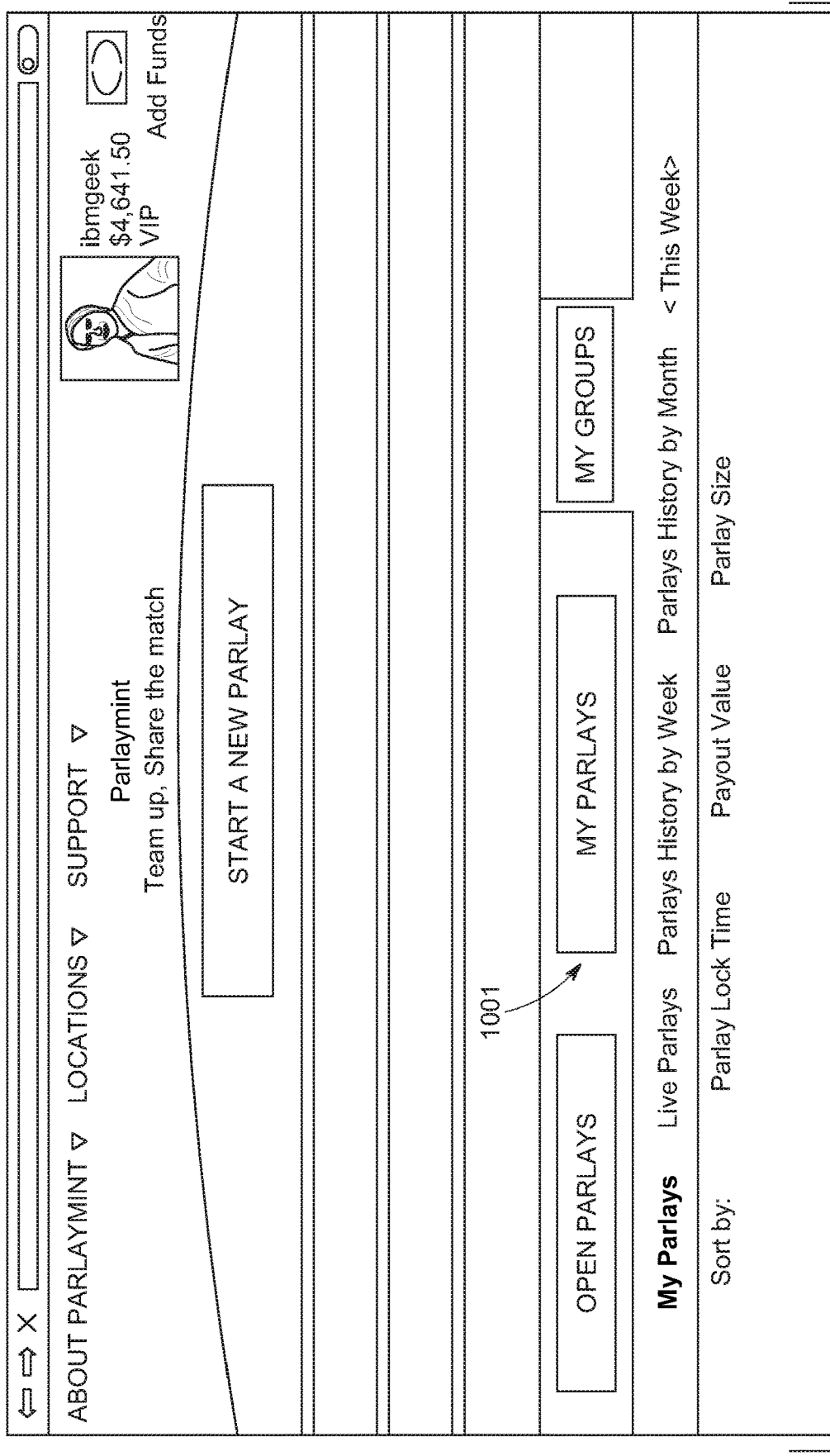
Figure 10B:
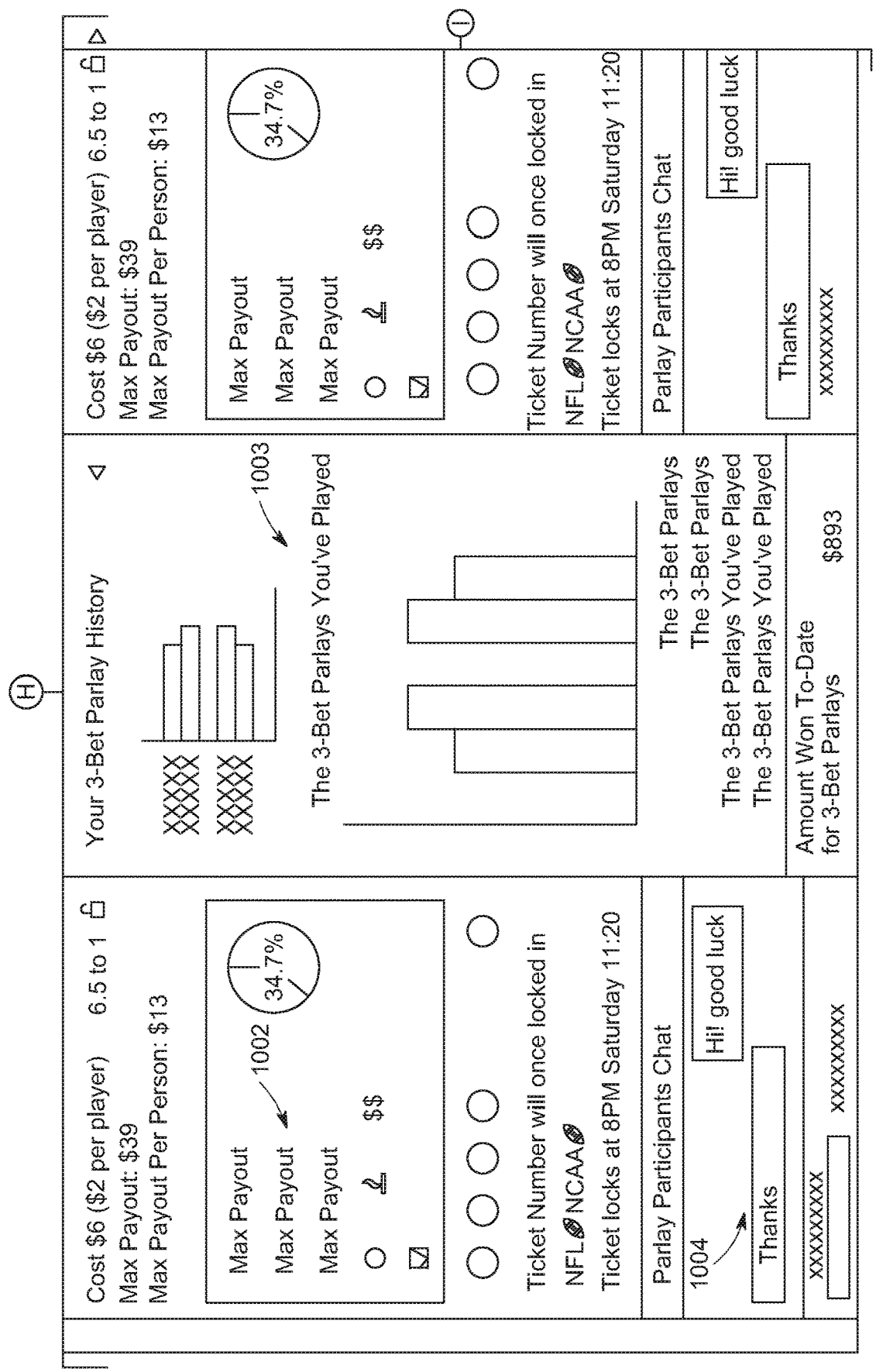
Figure 10C:
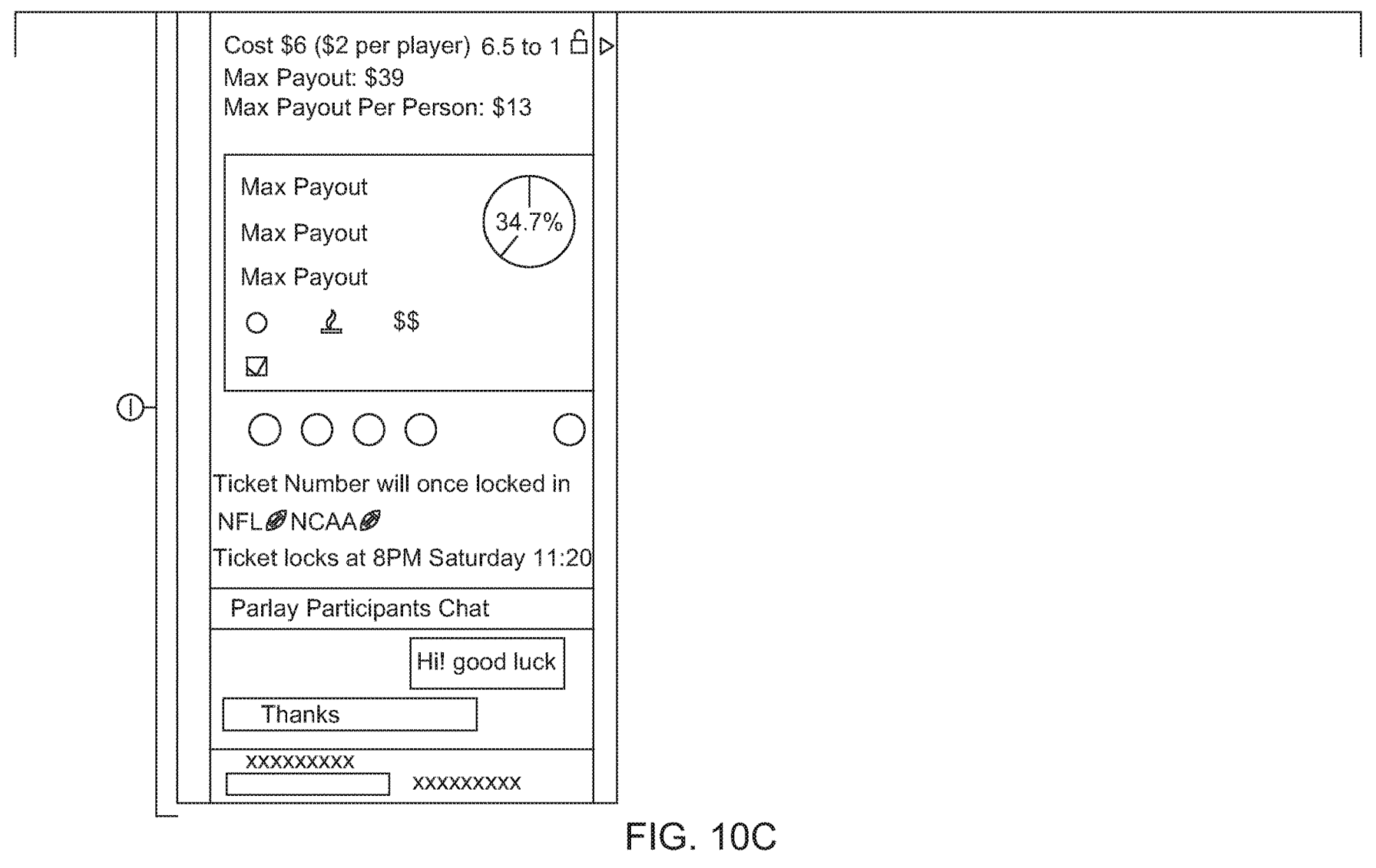

FIG. 10 is an exemplary wireframe of a my-parlays interface as represented by My Parlays block (308) and generated by the platform for display to at least one user according to an example of the instant disclosure. This interface is displayed to users when they select the My Parlays tab (1001). The interface allows users to view their live parlay tickets (those tickets awaiting participants and those tickets with games in progress), and history of parlay tickets in which they have submitted bets, among other functions. Parlay ticket (1002) shows an example parlay ticket. Users can view their history with similar such parlays as shown in the example noted by (1003). Users can chat among the other players who have submitted bets in the parlay ticket, as exemplified in area (1004).

Figure 11A:
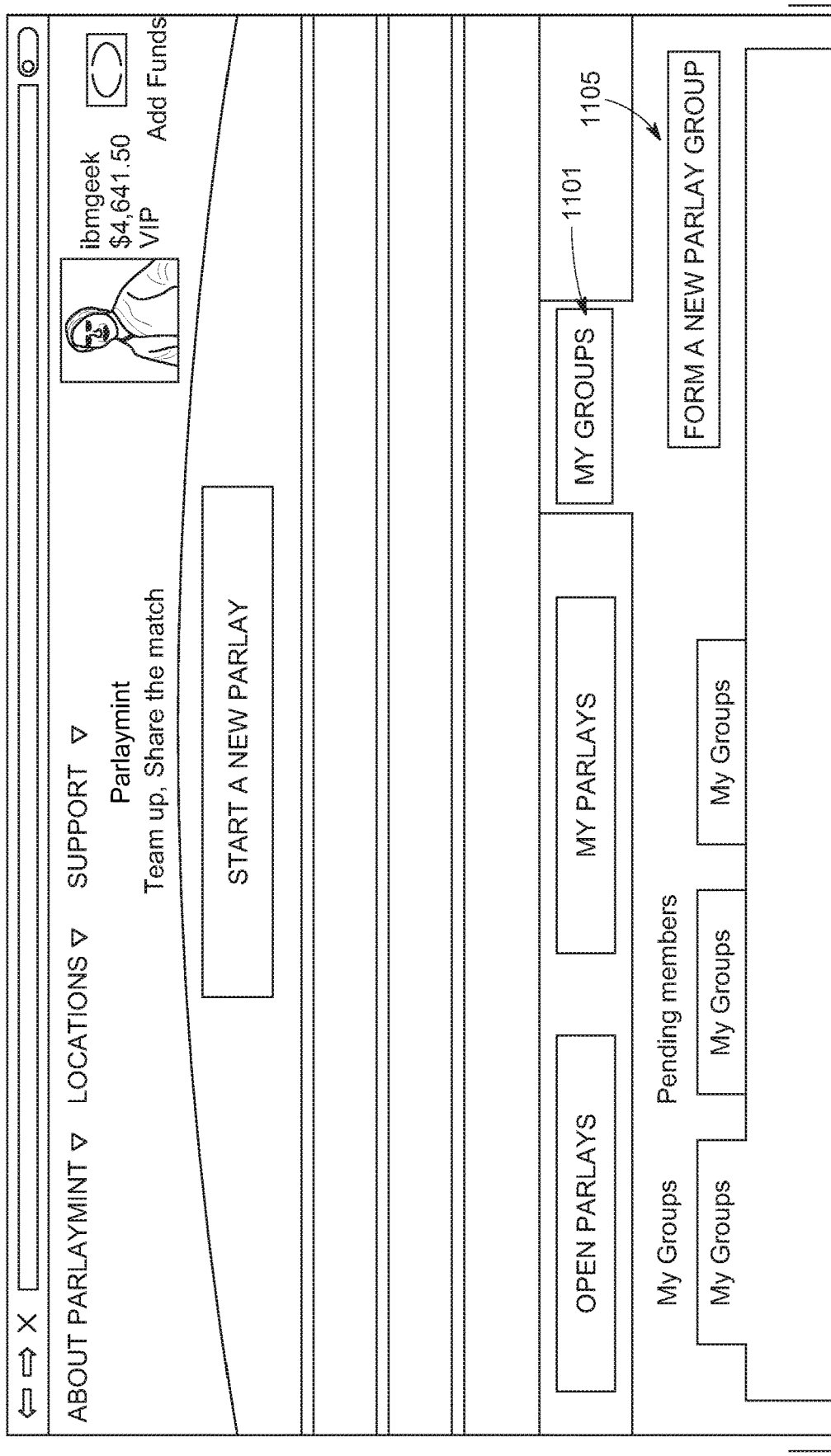
Figure 11B:
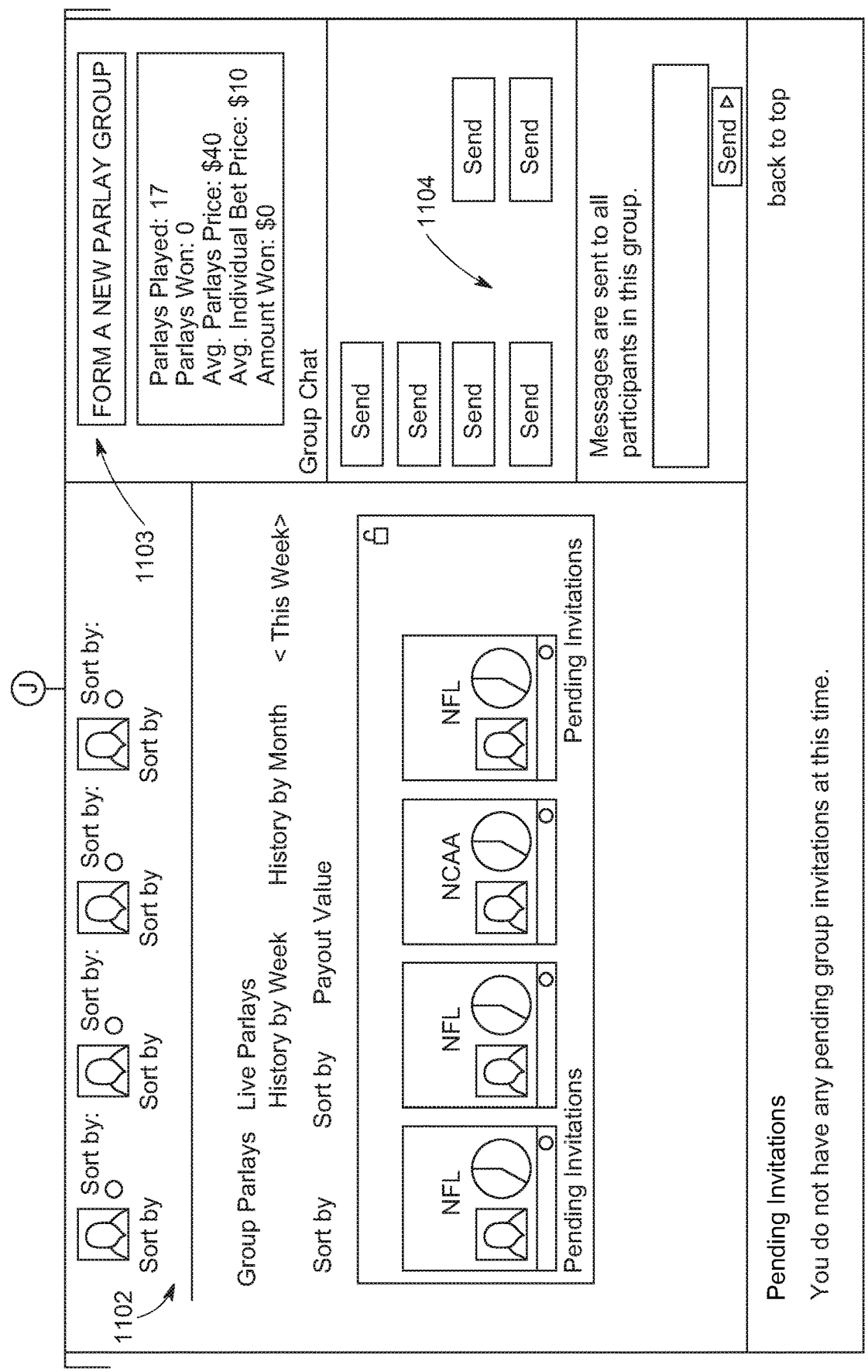

FIG. 11 is an exemplary wireframe of a my-groups interface as represented by My Groups block (311) and generated by the platform for display to at least one user according to an example of the instant disclosure. This interface is displayed to users when they select the My Groups tab (1101). The page allows users of the group (1102) to view and manage the groups and group parlay tickets they have started and joined. The interface contains the Start New Group Parlay button (1103) that allows users to start a new parlay ticket limited to entries submitted by other group members. The interface also shows an example of a chat area (1104) that allows group members to send chat communications amongst themselves. Users select the Form a New Parlay Group button (1105) to form a new group by inviting a set of new users to the group.

FIG. 12 is an exemplary wireframe of a new-group interface as represented by Start a New Parlay Group block (312) and generated by the platform for display to at least one user according to an example of the instant disclosure. This interface is displayed to users when they select the Form a New Parlay Group button (1105). The interface (1201) allows users to invite other players to participate in a new group. The interface contains the Send Group Invitation button (1202) that will send communications to the invited users allowing them to join the group.

Figure 13A:
Figure 13B:
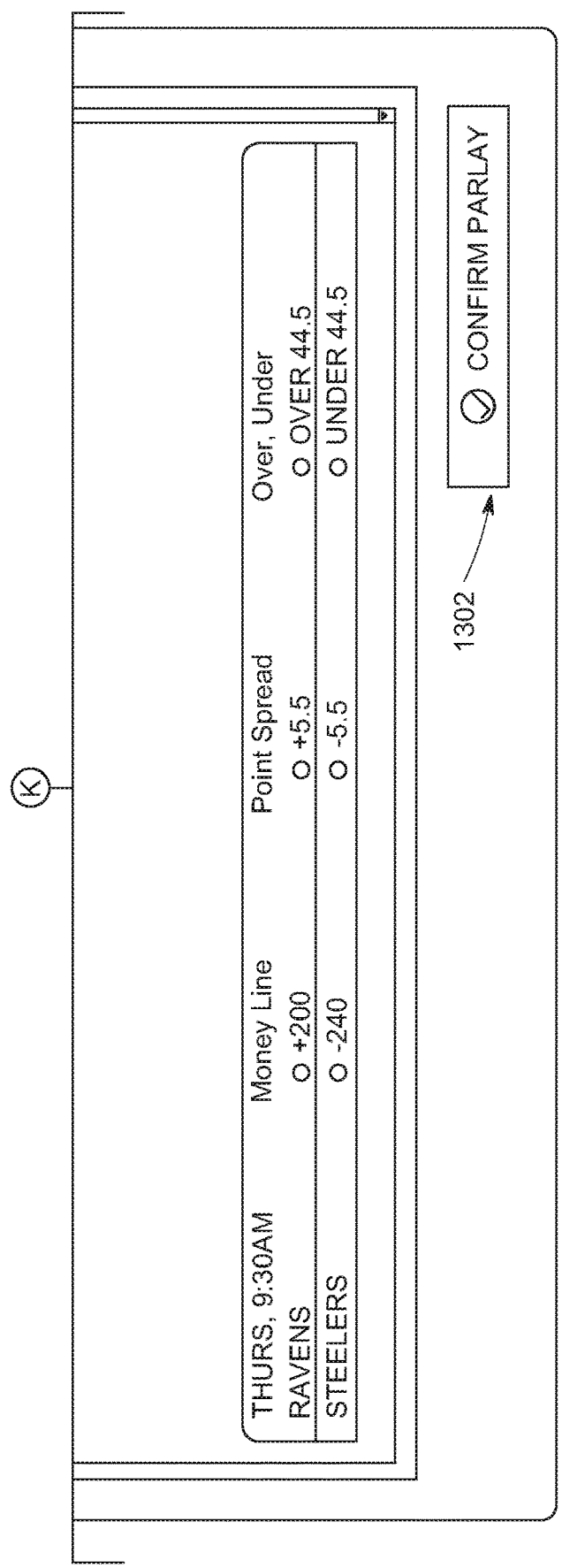

FIG. 13 is an exemplary wireframe of a new-group-parlay interface as represented by Start a New Group Parlay block (313) and generated by the platform for display to at least one user according to an example of the instant disclosure. This interface, similar to that depicted in FIG. 8 is displayed to users when they select the Start a New Group Parlay button (1103). The interface allows users to configure and start a new parlay consisting of bets contributed solely by members of the group, using the new parlay area (1301). The interface contains the Confirm Parlay button (1302) when the user is ready to start a parlay with the members of their group.

Figure 14:
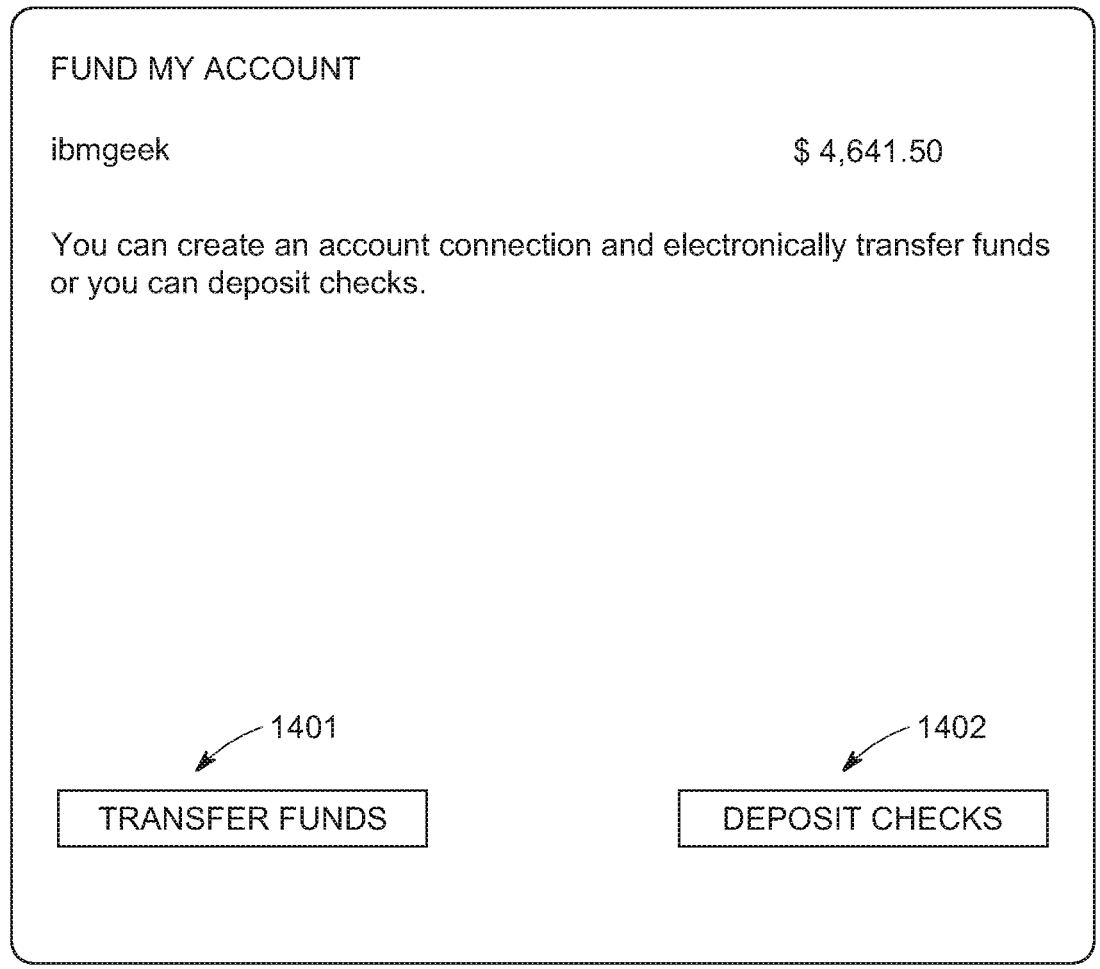

FIG. 14 is an exemplary wireframe of a fund-my-account interface as represented by Fund My Account block (305) and generated by the platform for display to at least one user according to an example of the instant disclosure. This interface is displayed to users when they select the Add Funds button (603). The interface allows users to add and manage their bankroll. Users can transfer funds (1401) to connect a financial account and transfer funds to/from their accounts at financial institutions or on credit cards. The interface contains the Deposit Checks button (1402) to use their cameras to capture checks written for the purpose of funding their account.

Figure 15:
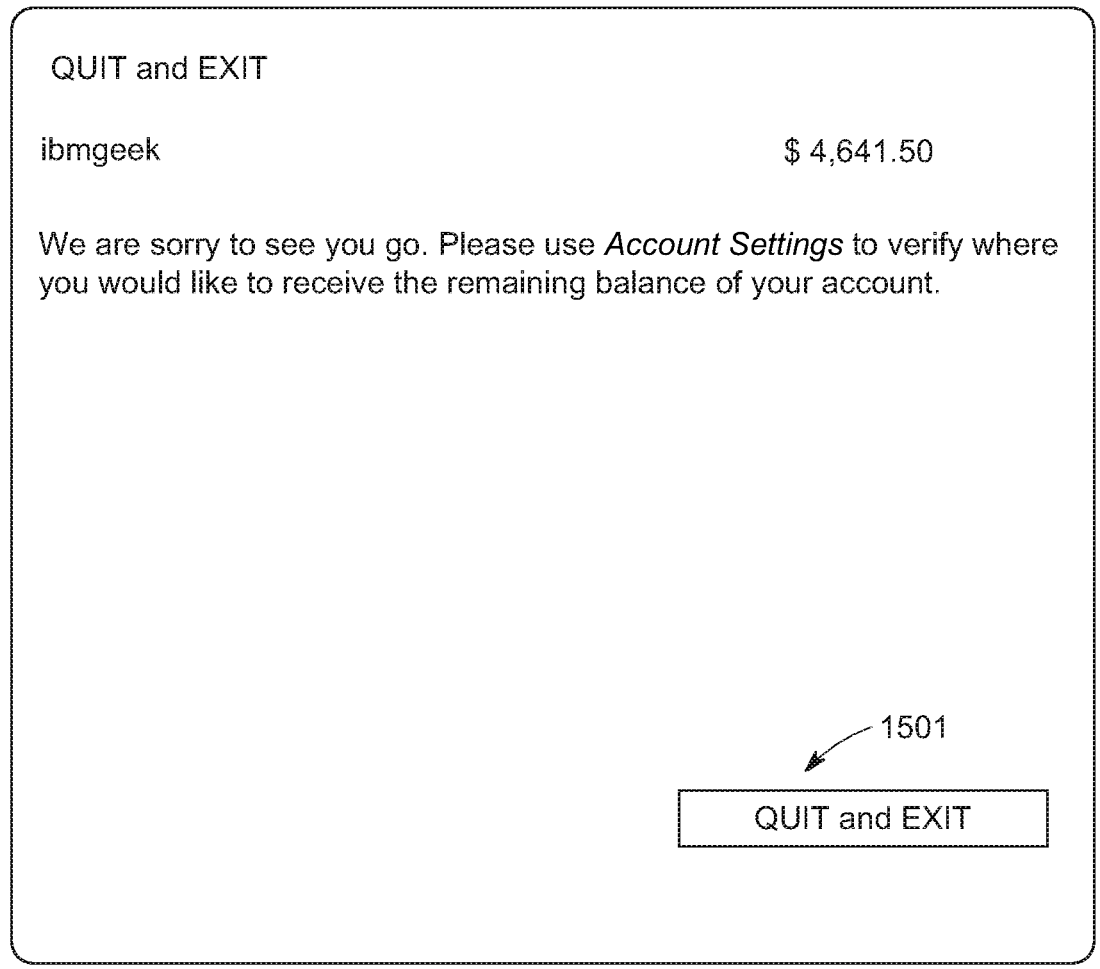

FIG. 15 is an exemplary wireframe of a quit-and-exit interface as represented by Quit and Exit block (314) and generated by the platform for display to at least one user according to an example of the instant disclosure. This interface is displayed to users when they select the Transfer Funds button (1403). The interface allows users to quit and exit the platform. Users use the Quit and Exit button (1501) to quit and exit.

FIG. 16 is an exemplary wireframe of an account-settings interface as represented by Account Settings block (304) and generated by the platform for display to at least one user according to an example of the instant disclosure. This interface is displayed to users when they select the Account Settings button (601). The interface allows users to manage their account settings. Users use the Edit button (1601) to manage account settings.

FIG. 17 is an exemplary wireframe of the default login screen on a mobile device as other examples of user devices (306) that can be used to display the interfaces described above and generated by the platform for display to at least one user according to an example of the instant disclosure.

Each of the user interfaces may be displayed by a browser of a user device (206) and/or a native application associated with the user device.

In one example, the server (202) may provide a multi-player wagering method including offering multiple betting options related to human sporting events to bettors while providing one or more wagering input devices in communication with a system controller, offering each bettor the ability to add funds to and withdraw funds from a bankroll/account for regions where the system is offered and this form of gambling is legal, receiving bets from the bettors to create publicly or privately crowdfunded parlays with each individual bet pertaining to a human sporting event, providing a means for bettors to browse a list of publicly crowdfunded parlays into which they can place a bet, providing a method for bettors to approve each of the individual bets within a publicly crowdfunded parlay, determining whether each bettor that participates in a crowd-funded parlay has sufficient funds to participate in the parlay, and only if so, withdrawing exact funds for the full cost of the parlay ticket from each bettor as their bet within a parlay is placed, determining whether each bet within crowdfunded parlays is a winning bet, a tied bet, or a losing bet, determining a payout amount for crowdfunded parlays that qualify as winning bets and crediting the bettors with bets in the parlay with the appropriate winnings, and determining the appropriate withdrawal amount required from each bettor participating in crowdfund parlays that qualify as losing bets and withdrawing a calculated cost of the parlay ticket only from those bettors in the parlay who lost their individual bets. In a further example, bettors may be offered an opportunity to secure a winning parlay ticket, albeit at a lesser payout amount, when there is one remaining bet in the crowdfunded parlay that pertains to a sporting event that has not yet started, while all other individual bets have already won. Bettors can form private groups to crowdfund bets limited to bettors within the group. In addition, bettors can invite other bettors to join groups to crowdfund bets. In another example, bettors can remove other bettors from groups. Bettors can view data and statistics related to their betting history and also can view data and statistics related to other bettors' history. Bettors can also view the individual bets within each crowdfunded parlay. Bettors can, if so desired, remove their bets as other bettors submit bets within each crowdfunded parlay. Additionally, bettors can participate in special daily, weekly, and monthly contests, as well as special daily, weekly, and monthly betting events.

In another example, the server 202 can be a system that includes at least one processing element which is adapted to receive wagers on human sporting events, to calculate odds relating to the wagers based on a pari-mutuel wagering strategy, to determine whether the received wagers are winning wagers, and to determine a payout amount for the winning wagers based on the pari-mutuel wagering strategy. In addition, the system can include a plurality of linking elements which are communicatively coupled to the database with at least one processing element and which are adapted to allow for communication with the at least one processing element; and a plurality of input elements which are communicatively coupled to the plurality of linking elements and which allow bettors to communicate with the at least one processing element in order to place bets. In an example, the input elements of the system may include elements available through electronic devices such as smartphones, kiosks, wearables, computers, and tablets. The linking elements may include wireless networking elements, wired networking elements, gateway elements, servers, and portals. The at least one processing element may be a host server. The system may utilize location services, or other such technology, available through cellular, Wi-Fi, Global Positioning System (GPS) networks, and Bluetooth to validate that the user is using the system in a location where sports gambling is legal. Where not legal, users can play for free.

Figure 18:
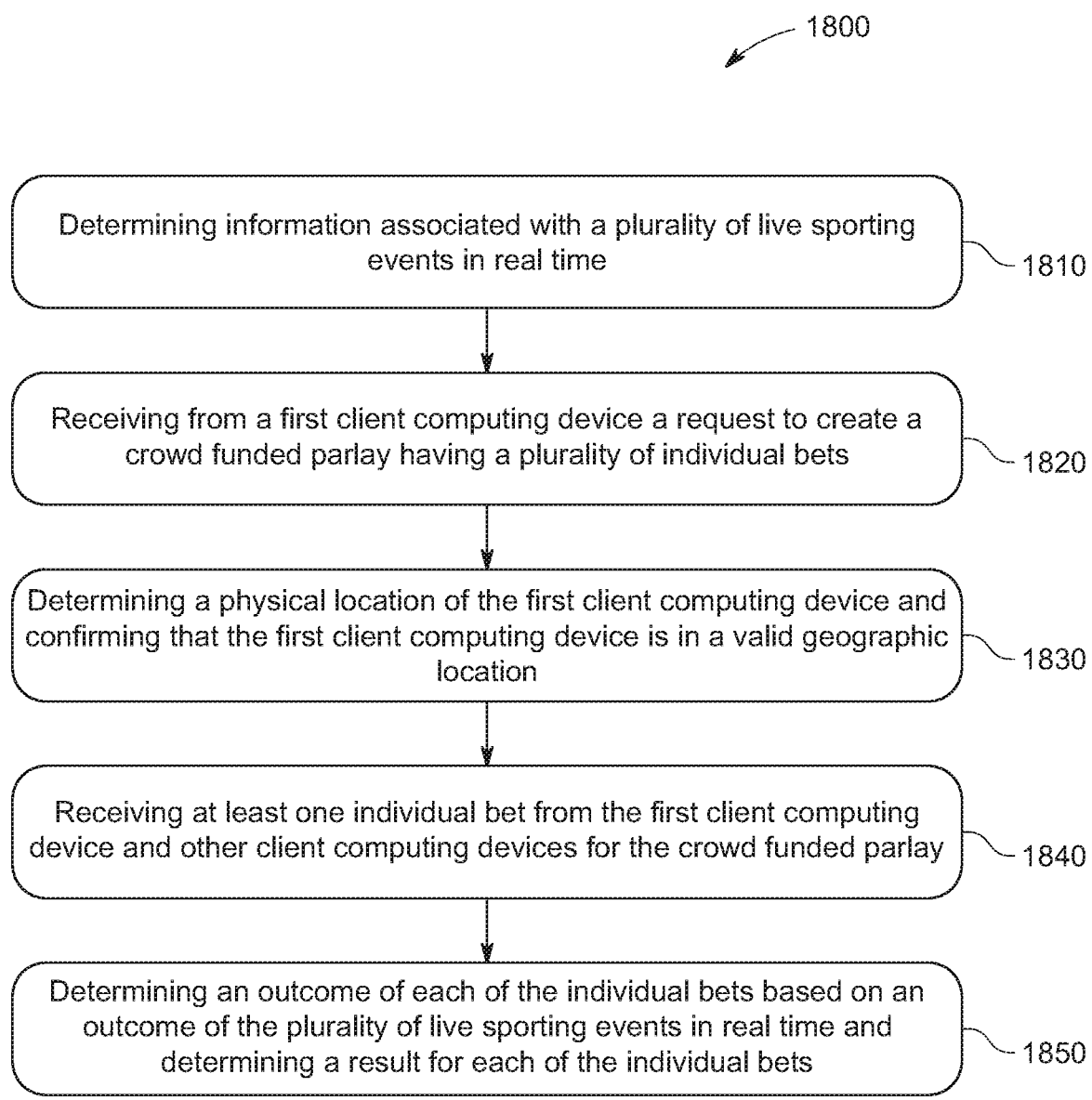
FIG. 18 shows a flow diagram showing operations executed by a server computing device according to an example of the instant disclosure.

FIG. 18 illustrates a flowchart of a process 1800 for creating a crowdfunded parlay for a plurality of users according to an example of the instant disclosure. In a first step 1810, the server 202 determines information associated with a plurality of live sporting events in realtime, the live sporting events having human players and rules to determine a winner of each live sporting event. Next, in step 1820, the server 202 receives from a first client computing device of a plurality of client computing devices, e.g., user devices 206, a request to create a crowdfunded parlay. The request may be based on a selection of a create a crowdfunded parlay user interface element on a touchscreen user interface of the first client computing device 206 and the crowdfunded parlay may have a plurality of individual bets, each individual bet associated with at least one of the plurality of live sporting events.

As an example, this may include receiving a request for a list of publicly crowdfunded parlays from the first client computing device 206 and transmitting the list of publicly crowdfunded parlays to the first client computing device for display on the first client computing device. As an example, the process 1800 may include transmitting information associated with one of a daily contest or betting event, a weekly daily contest or betting event, and a monthly contest or betting event.

Next, in step 1830, the server 202 may determine a first physical location of the first client computing device sent by the first client computing device 206 and confirm that the first physical location is a valid geographic location located within a particular geofenced area to create the crowdfunded parlay, e.g., state borders associated with a state that has legalized sports betting such as Nevada, Colo., Pennsylvania, or Iowa. The process 1800 may include determining the first physical location of the first client computing device using at least one of cellular, Wi-Fi, Global Positioning System (GPS) networks, and Bluetooth to validate that the first client computing device is located in a location where sports gambling is legal.

In step 1840, the server 202 may receive a first individual bet from the first client computing device 206 associated with the at least one of the plurality of live sporting events. The user of the first client computing device may select an individual bet user interface element on the touchscreen user interface of the first client computing device and the first individual bet may have a first amount deposited by the first client computing device.

The process 1800 may include determining whether each bettor that participates in the crowdfunded parlay has sufficient funds to participate in the crowdfunded parlay, and withdrawing exact funds for a full cost of a crowdfunded parlay ticket from each bettor as a bet is placed.

The process 1800 may include sending an invitation to the crowdfunding parlay to at least one client computing device of the plurality of client computing devices.

In step 1840, the server 202 may continue to receive individual bets from other users using client computing devices 206 and the individual bets may be added to the crowdfunded parlay. This may include determining a second physical location of a second client computing device of the plurality of client computing devices 206, the second physical location sent by second client computing device, and confirming that the second physical location is a valid physical location within the particular geofenced area to receive an individual bet. This also may include receiving a second individual bet from a second client computing device associated with the at least one of the plurality of live sporting events. As an example, a user may select an individual bet user interface element on a touchscreen user interface of the second client computing device and this may add the second individual bet to the crowdfunded parlay, the second individual bet having a second amount deposited by the second client computing device. Step 1840 may include receiving individual bets to add to the crowdfunded parlay from a third client computing device, a fourth client computing device, a fifth client computing device, and so on.

As an example, the process 1800 may include displaying on a display of at least one client computing device each individual bet associated with the crowdfunded parlay. As another example, the process 1800 may include requesting an approval of each of the individual bets within the crowdfunded parlay.

In step 1850, the server 202 may determine an outcome of the first individual bet and an outcome of the second individual bet based on an outcome of the plurality of live sporting events in realtime and transmit information associated with the outcome of the first individual bet and the outcome of the second individual bet to be displayed in realtime on the first client computing device and the second client computing device. In addition, the server 202 may determine a result for the first individual bet and a result for the second individual bet and award a share of a parlay payout based on the result for the first individual bet and the second individual bet as well as other individual bets. Step 1850 may include determining whether each bet within the crowdfunded parlay is a winning bet, a tied bet, or a losing bet.

In some examples, one bettor may be offered an opportunity to secure a winning parlay ticket at a lesser payout amount when there is at least one remaining bet in the crowdfunded parlay associated with a sporting event that has not yet started, while all other individual bets have already won.

The process 1800 may further include determining that the first individual bet is a win and determining that the second individual bet is a win and awarding an equal share of the parlay payout to the first client computing device and the second client computing device.

Additionally, the process 1800 may include creating the crowdfunded parlay as one of a public crowdfunded parlay and a private crowdfunded parlay.

As an example, the process 1800 may include determining that the first individual bet is a loss and the second individual bet is a win and debiting an account associated with the first computing device for the crowdfunded parlay.

In another example, the process 1800 may include determining that the second individual bet is a loss and the first individual bet is a win and debiting an account associated with the second computing device for the crowdfunded parlay.

In another example, the process 1800 may include determining that the first individual bet is a loss and the second individual bet is a loss and dividing a cost of the crowdfunded parlay between an account associated with the first computing device and an account associated with the second computing device.

The process 1800 may further include one of adding and withdrawing funds based on a request from one of the first client computing device and the second client computing device, the funds associated with the crowdfunded parlay.

The process 1800 may include receiving a request for history information and transmitting data and statistics related to a betting history for a user using the first client computing device. Additionally, the process 1800 may include receiving a request for history information and transmitting data and statistics related to betting history for users other than a user using the first client computing device.

Figure 19:
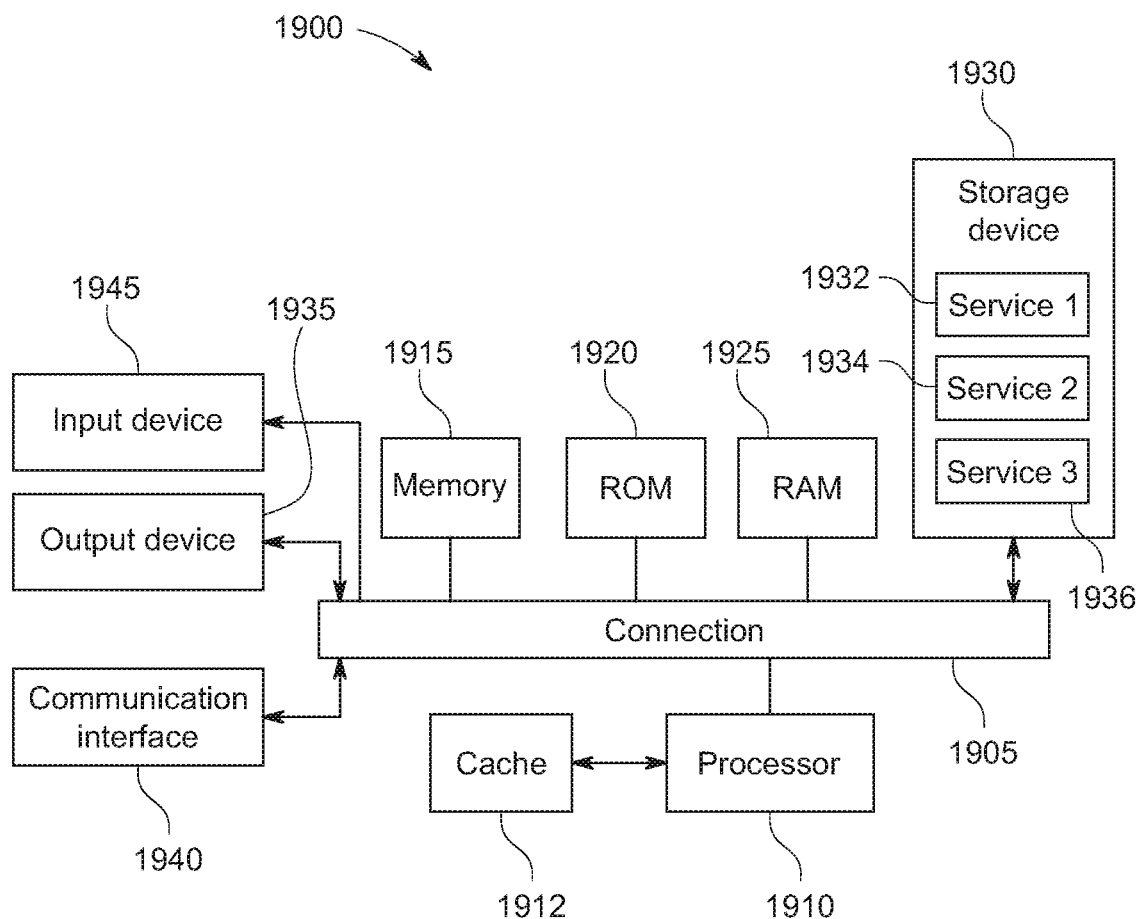
FIG. 19 shows an example of a system for implementing certain aspects of the present technology.

FIG. 19 shows an example of computing system 1900, which can be for example any computing device making up the server 202, the user device 206, or any component thereof in which the components of the system are in communication with each other using connection 1905. Connection 1905 can be a physical connection via a bus, or a direct connection into processor 1910, such as in a chipset architecture. Connection 1905 can also be a virtual connection, networked connection, or logical connection.

In some embodiments, computing system 1900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1900 includes at least one processing unit (CPU or processor) 1910 and connection 1905 that couples various system components including system memory 1915, such as read-only memory (ROM) 1920 and random access memory (RAM) 1925 to processor 1910. Computing system 1900 can include a cache of high-speed memory 1912 connected directly with, in close proximity to, or integrated as part of processor 1910.

Processor 1910 can include any general purpose processor and a hardware service or software service, such as services 1932, 1934, and 1936 stored in storage device 1930, configured to control processor 1910 as well as a special-purpose processor where software instructions are incorporated into the actual processor design. Processor 1910 may essentially be a completely self-contained computing system, containing multiple cores or processors, a bus, memory controller, cache, etc. A multi-core processor may be symmetric or asymmetric.

To enable user interaction, computing system 1900 includes an input device 1945, which can represent any number of input mechanisms, such as a microphone for speech, a touch-sensitive screen for gesture or graphical input, keyboard, mouse, motion input, speech, etc. Computing system 1900 can also include output device 1935, which can be one or more of a number of output mechanisms known to those of skill in the art. In some instances, multimodal systems can enable a user to provide multiple types of input/output to communicate with computing system 1900. Computing system 1900 can include communications interface 1940, which can generally govern and manage the user input and system output. There is no restriction on operating on any particular hardware arrangement, and therefore the basic features here may easily be substituted for improved hardware or firmware arrangements as they are developed.

Storage device 1930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1930 can include software services, servers, services, etc., that when the code that defines such software is executed by the processor 1910, it causes the system to perform a function. In some embodiments, a hardware service that performs a particular function can include the software component stored in a computer-readable medium in connection with the necessary hardware components, such as processor 1910, connection 1905, output device 1935, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method comprising:
  determining, by at least one processor, information associated with a plurality of live sporting events in real-time, the live sporting events having human players and rules to determine a winner of each live sporting event;
  receiving, by the at least one processor, from a first client computing device of a plurality of client computing devices, a request to create a crowdfunded parlay comprising a selection of a create a crowdfunded parlay user interface element on a touchscreen user interface of the first client computing device, the crowdfunded parlay having a plurality of individual bets, each individual bet associated with at least one of the plurality of live sporting events;
  determining, by the at least one processor, a first physical location of the first client computing device sent by the first client computing device, using at least one of cellular, Wi-Fi, Global Positioning System (GPS) networks, and Bluetooth to validate that the first client computing device is located in a location where sports gambling is legal, and confirming that the first physical location is a valid geographic location located within a particular geofenced area to create the crowdfunded parlay;
  receiving, by the at least one processor, a first individual bet from the first client computing device associated with the at least one of the plurality of live sporting events comprising a selection of an individual bet user interface element on the touchscreen user interface of the first client computing device, the first individual bet having a first amount deposited by a user of the first client computing device;
  determining, by the at least one processor, a second physical location of a second client computing device of the plurality of client computing devices, using at least one of cellular, Wi-Fi, Global Positioning System (GPS) networks, and Bluetooth to validate that the second client computing device is located in a location where sports gambling is legal, the second physical location sent by the second client computing device, and confirming that the second physical location is a valid physical location within the particular geofenced area to receive an individual bet;

receiving, by the at least one processor, a second individual bet from a second client computing device associated with the at least one of the plurality of live sporting events comprising a selection of an individual bet user interface element on a touchscreen user interface of the second client computing device and adding the second individual bet to the crowdfunded parlay, the second individual bet having a second amount deposited by a user of the second client computing device;

continually determining, by the at least one processor, that the first client computing device and the second client computing device are in a valid physical location to participate in the crowdfunded parlay until a predetermined number of bets have been approved and added to the crowdfunded parlay, limiting each of the first client computing device and the second client computing device to the first individual bet and the second individual bet, determining that the first individual bet and the second individual bet are different, and determining that the first amount deposited by the user of the first client computing device and the second amount deposited by the user of the second client computing device each individually cover the predetermined number of bets;

receiving, by the at least one processor, an outcome of each of the plurality of live sporting events in realtime based on at least one application programming interface (API) from at least one server computing device;

determining, by the at least one processor, an outcome of the first individual bet and an outcome of the second individual bet based on the outcome of the plurality of live sporting events in realtime and transmitting information associated with the outcome of the first individual bet and the outcome of the second individual bet to be displayed in realtime on the first client computing device and the second client computing device; and determining, by the at least one processor, a result for the first individual bet and a result for the second individual bet and awarding a share of a parlay payout based on the result for the first individual bet and the second individual bet.

2. The method of claim 1, further comprising determining that the first individual bet is a win and determining that the second individual bet is a win and awarding an equal share of the parlay payout to the first client computing device and the second client computing device.

3. The method of claim 1, further comprising creating the crowdfunded parlay as one of a public crowdfunded parlay and a private crowdfunded parlay.

4. The method of claim 1, further comprising determining that the first individual bet is a loss and the second individual bet is a win and debiting an account associated with the first computing device for the crowdfunded parlay.

5. The method of claim 1, further comprising determining that the second individual bet is a loss and the first individual bet is a win and debiting an account associated with the second computing device for the crowdfunded parlay.

6. The method of claim 1, further comprising determining that the first individual bet is a loss and the second individual bet is a loss and dividing a cost of the crowdfunded parlay between an account associated with the first computing device and an account associated with the second computing device.

7. The method of claim 1, further comprising one of adding and withdrawing funds based on a request from one of the first client computing device and the second client computing device, the funds associated with the crowdfunded parlay.

8. The method of claim 1, further comprising receiving a request for a list of publicly crowdfunded parlays from the first client computing device and transmitting the list of publicly crowdfunded parlays to the first client computing device for display on the first client computing device.

9. The method of claim 1, further comprising determining whether each bettor that participates in the crowdfunded parlay has sufficient funds to participate in the crowdfunded parlay, and withdrawing exact funds for a full cost of a crowdfunded parlay ticket from each bettor as a bet is placed.

10. The method of claim 1, further comprising determining whether each bet within the crowdfunded parlay is a winning bet, a tied bet, or a losing bet.

11. The method of claim 1, wherein at least one bettor is offered an opportunity to secure a winning parlay ticket at a lesser payout amount when there is at least one remaining bet in the crowdfunded parlay associated with a sporting event that has not yet started, while all other individual bets have already won.

12. The method of claim 1, further comprising sending an invitation to the crowdfunding parlay to at least one client computing device of the plurality of client computing devices.

13. The method of claim 1, further comprising receiving a request for history information and transmitting data and statistics related to a betting history for the user using the first client computing device.

14. The method of claim 1, further comprising receiving a request for history information and transmitting data and statistics related to betting history for users other than the user using the first client computing device.

15. The method of claim 1, further comprising displaying on a display of at least one client computing device each individual bet associated with the crowdfunded parlay.

16. The method of claim 1, further comprising transmitting information associated with one of a daily contest or betting event, a weekly daily contest or betting event, and a monthly contest or betting event.

17. The method of claim 1, further comprising requesting an approval of each of the individual bets within the crowdfunded parlay.

18. A system, comprising:
a processor; and
a memory device in communication with the processor, the processor to:
determine information associated with a plurality of live sporting events in realtime, the live sporting events having human players and rules to determine a winner of each live sporting event;
receive from a first client computing device of a plurality of client computing devices, a request to create a crowdfunded parlay comprising a selection of a create a crowdfunded parlay user interface element on a touchscreen user interface of the first client computing device, the crowdfunded parlay having a plurality of individual bets, each individual bet associated with at least one of the plurality of live sporting events;

determine a first physical location of the first client computing device sent by the first client computing device, using at least one of cellular, Wi-Fi, Global Positioning System (GPS) networks, and Bluetooth to validate that the first client computing device is located in a location where sports gambling is legal, and confirm that the first physical location is a valid geographic location located within a particular geofenced area to create the crowdfunded parlay;

receive, by the at least one processor, a first individual bet from the first client computing device associated with the at least one of the plurality of live sporting events comprising a selection of an individual bet user interface element on the touchscreen user interface of the first client computing device, the first individual bet having a first amount deposited by a user of the first client computing device;

determine a second physical location of a second client computing device of the plurality of client computing devices, using at least one of cellular, Wi-Fi, Global Positioning System (GPS) networks, and Bluetooth to validate that the second client computing device is located in a location where sports gambling is legal, the second physical location sent by the second client computing device, and confirm that the second physical location is a valid physical location within the particular geofenced area to receive an individual bet;

receive a second individual bet from the second client computing device associated with the at least one of the plurality of live sporting events comprising a selection of an individual bet user interface element on a touchscreen user interface of the second client computing device and add the second individual bet to the crowdfunded parlay, the second individual bet having a second amount deposited by a user of the second client computing device;

continually determine that the first client computing device and the second client computing device are in a valid physical location to participate in the crowdfunded parlay until a predetermined number of bets have been approved and added to the crowdfunded parlay, limit each of the first client computing device and the second client computing device to the first individual bet and the second individual bet, determine that the first individual bet and the second individual bet are different, and determine that the first amount deposited by the user of the first client computing device and the second amount deposited by the user of the second client computing device each individually cover the predetermined number of bets;

receive an outcome of each of the plurality of live sporting events in realtime based on at least one application programming interface (API) from at least one server computing device;

determine an outcome of the first individual bet and an outcome of the second individual bet based on the outcome of the plurality of live sporting events in realtime and transmit information associated with the outcome of the first individual bet and the outcome of the second individual bet to be displayed in realtime on the first client computing device and the second client computing device; and determine a result for the first individual bet and a result for the second individual bet and award a share of a parlay payout based on the result for the first individual bet and the second individual bet.

19. A non-transitory computer-readable storage medium, having instructions stored thereon that, when executed by at least one computing device cause the at least one computing device to perform operations, the operations comprising:

determining information associated with a plurality of live sporting events in realtime, the live sporting events having human players and rules to determine a winner of each live sporting event;

receiving, from a first client computing device of a plurality of client computing devices, a request to create a crowdfunded parlay comprising a selection of a create a crowdfunded parlay user interface element on a touchscreen user interface of the first client computing device, the crowdfunded parlay having a plurality of individual bets, each individual bet associated with at least one of the plurality of live sporting events;

determining a first physical location of the first client computing device sent by the first client computing device, using at least one of cellular, Wi-Fi, Global Positioning System (GPS) networks, and Bluetooth to validate that the first client computing device is located in a location where sports gambling is legal, and confirming that the first physical location is a valid geographic location located within a particular geofenced area to create the crowdfunded parlay;

receiving a first individual bet from the first client computing device associated with the at least one of the plurality of live sporting events comprising a selection of an individual bet user interface element on the touchscreen user interface of the first client computing device, the first individual bet having a first amount deposited by a user of the first client computing device;

determining a second physical location of a second client computing device of the plurality of client computing devices, using at least one of cellular, Wi-Fi, Global Positioning System (GPS) networks, and Bluetooth to validate that the first client computing device is located in a location where sports gambling is legal, the second physical location sent by the second client computing device, and confirming that the second physical location is a valid physical location within the particular geofenced area to receive an individual bet;

receiving a second individual bet from the second client computing device associated with the at least one of the plurality of live sporting events comprising a selection of an individual bet user interface element on a touchscreen user interface of the second client computing device and adding the second individual bet to the crowdfunded parlay, the second individual bet having a second amount deposited by a user of the second client computing device;

continually determining the first client computing device and the second client computing device are in a valid physical location to participate in the crowdfunded parlay until a predetermined number of bets have been approved and added to the crowdfunded parlay, limiting each of the first client computing device and the second client computing device to the first individual bet and the second individual bet, determining that the first individual bet and the second individual bet are different, and determining that the first amount deposited by the user of the first client computing device and the second amount deposited by the user of the second client computing device each individually cover the predetermined number of bets;

receiving an outcome of each of the plurality of live sporting events in realtime based on at least one application programming interface (API) from at least one server computing device;

determining an outcome of the first individual bet and an outcome of the second individual bet based on the outcome of the plurality of live sporting events in realtime and transmitting information associated with the outcome of the first individual bet and the outcome of the second individual bet to be displayed in realtime on the first client computing device and the second client computing device; and determining a result for the first individual bet and a result for the second individual bet and awarding a share of a parlay payout based on the result for the first individual bet and the second individual bet.

* * * * *